(12) United States Patent
Imine et al.

(10) Patent No.: US 8,352,763 B2
(45) Date of Patent: Jan. 8, 2013

(54) POWER CONTROL SYSTEM AND CONTROL METHOD FOR THE SAME

(75) Inventors: Ryotaro Imine, Machida (JP); Takehito Utsunomiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 13/027,026

(22) Filed: Feb. 14, 2011

(65) Prior Publication Data
US 2011/0213996 A1    Sep. 1, 2011

(30) Foreign Application Priority Data

Mar. 1, 2010    (JP) ................................ 2010-044632
Dec. 22, 2010   (JP) ................................ 2010-286646

(51) Int. Cl.
*G06F 1/32* (2006.01)
(52) U.S. Cl. ........ 713/310; 713/320; 713/323; 713/324; 713/330
(58) Field of Classification Search .................... 713/323
See application file for complete search history.

(56) References Cited

U.S. PATENT DOCUMENTS

| 7,581,125 B2 * | 8/2009 | Ranganathan et al. ........ 713/320 |
| 7,647,516 B2 * | 1/2010 | Ranganathan et al. ........ 713/320 |
| 8,010,815 B2 * | 8/2011 | Hamilton et al. ............. 713/320 |
| 8,225,119 B2 * | 7/2012 | Jain et al. ................... 713/320 |
| 2005/0138438 A1 * | 6/2005 | Bodas .......................... 713/300 |
| 2007/0201080 A1 | 8/2007 | Igarashi |
| 2007/0300083 A1 * | 12/2007 | Goodrum et al. ............. 713/300 |
| 2008/0178029 A1 * | 7/2008 | McGrane et al. ............. 713/324 |
| 2008/0201594 A1 * | 8/2008 | Narushima ................... 713/324 |
| 2010/0162013 A1 * | 6/2010 | Oh et al. ..................... 713/310 |
| 2010/0211807 A1 * | 8/2010 | Akimoto ...................... 713/310 |
| 2010/0233989 A1 * | 9/2010 | Constien et al. ........... 455/343.1 |
| 2010/0325465 A1 * | 12/2010 | Kazama et al. .............. 713/340 |
| 2011/0211851 A1 | 9/2011 | Imine et al. |
| 2011/0313582 A1 * | 12/2011 | van Megen et al. .......... 700/292 |

FOREIGN PATENT DOCUMENTS

JP    2007-233611 A    9/2007
JP    2007-249563 A    9/2007

* cited by examiner

*Primary Examiner* — Ryan Stiglic
(74) *Attorney, Agent, or Firm* — Fitzpatrick, Cella, Harper & Scinto

(57) ABSTRACT

Provided is technology for enabling power saving control that allows a change of control content according to a user selection in a power control system that saves power consumed by an information processing apparatus. The power control system of the present invention include an image processing apparatus 102 as an example of the information processing apparatus and a power consumption management apparatus 106 that manages the amount of power consumption of the image processing apparatus 102. The image processing apparatus 102, in power saving control based on a control mode according to the amount of power consumption, if execution of a job instructed by a user is restricted depending on a power saving setting received from the power consumption management apparatus 106, changes control content of the control mode to content that has been determined as a substitution for the control content for allowing the job to be executed.

7 Claims, 19 Drawing Sheets

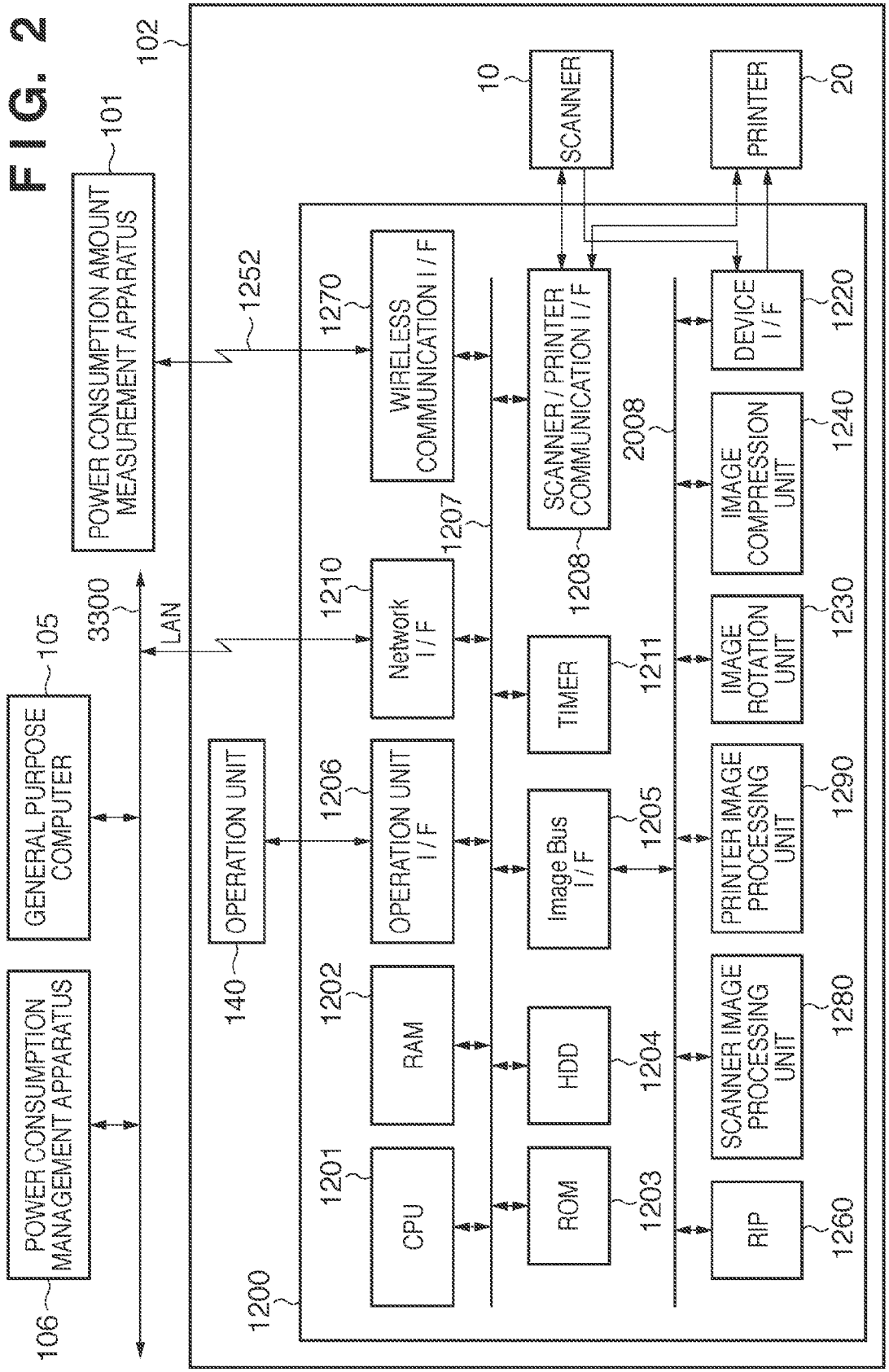

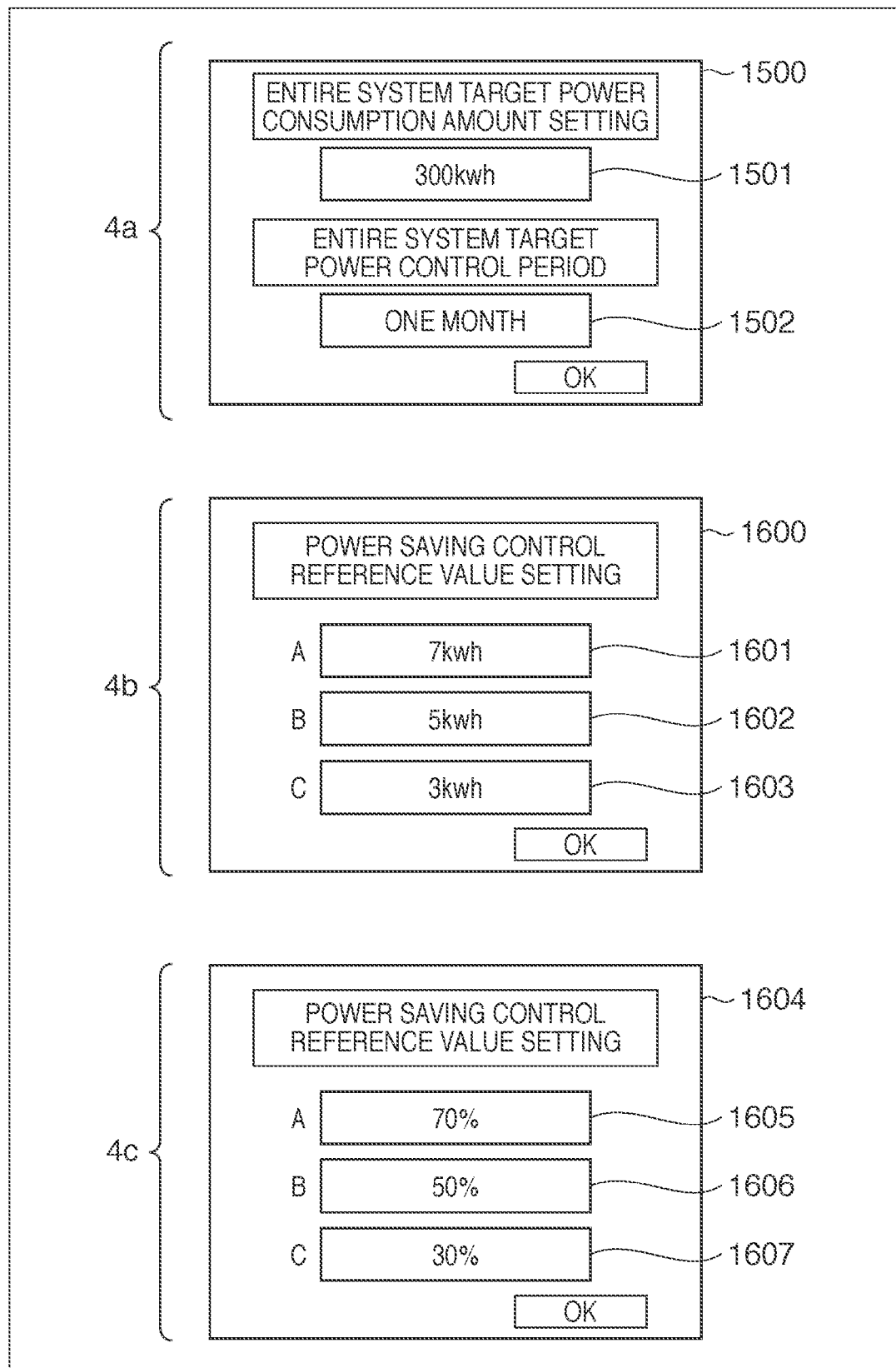

FIG. 8
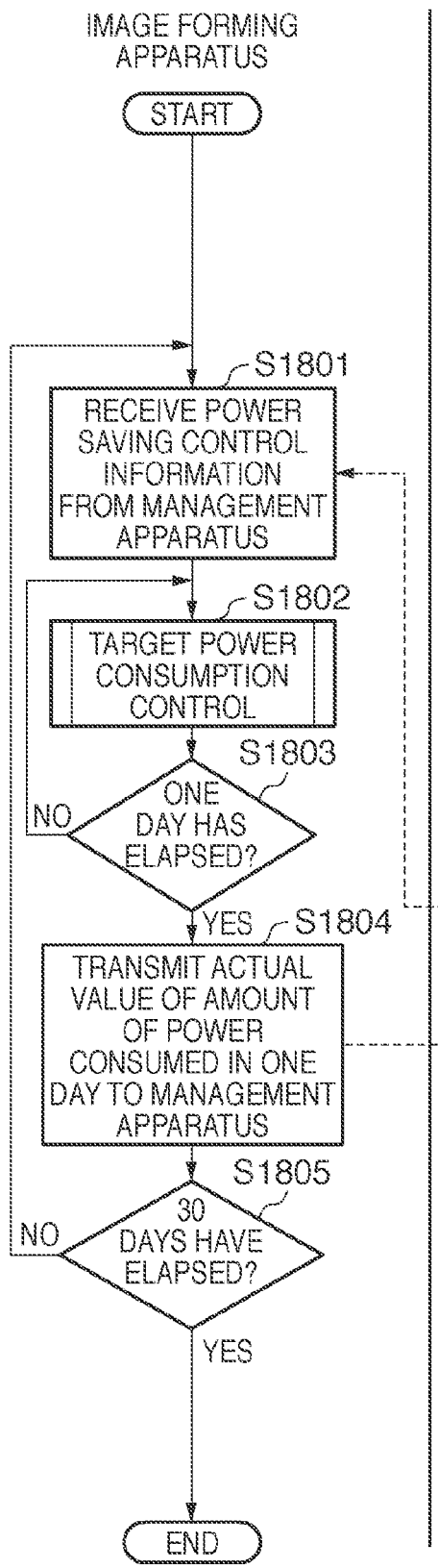
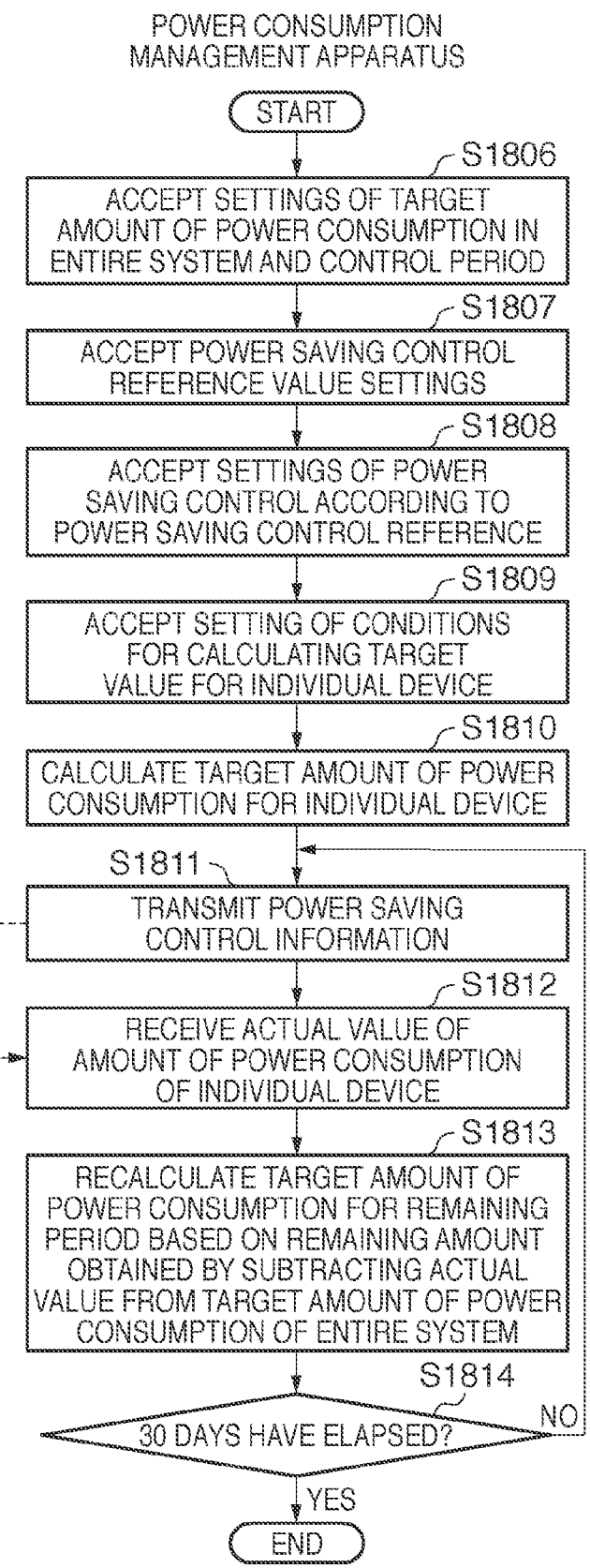

FIG. 12A

| 2301 | 2302 | 2303 | 2304 |
|---|---|---|---|
| SINGLE-SIDED PRINTING | COLOR | UNEXECUTABLE | – |
| DOUBLE-SIDED PRINTING | COLOR | UNEXECUTABLE | – |
| SINGLE-SIDED PRINTING, 2 IN 1 | COLOR | UNEXECUTABLE | – |
| SINGLE-SIDED PRINTING, 4 IN 1 | COLOR | EXECUTABLE | – |
| SINGLE-SIDED PRINTING | MONOCHROME | UNEXECUTABLE | – |
| DOUBLE-SIDED PRINTING | MONOCHROME | EXECUTABLE | – |
| SINGLE-SIDED PRINTING, 2 IN 1 | MONOCHROME | EXECUTABLE | – |
| SINGLE-SIDED PRINTING, 4 IN 1 | MONOCHROME | EXECUTABLE | – |

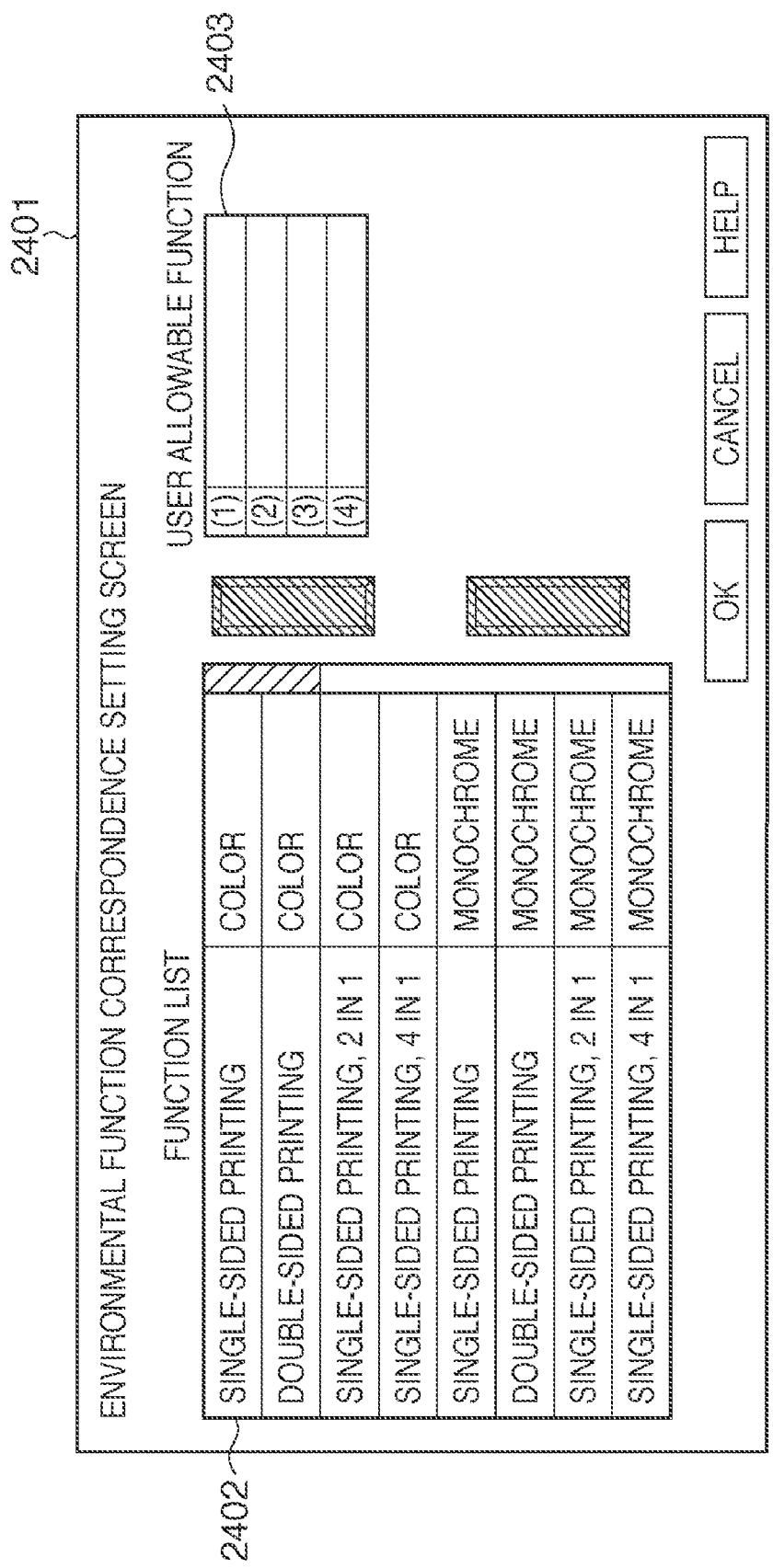

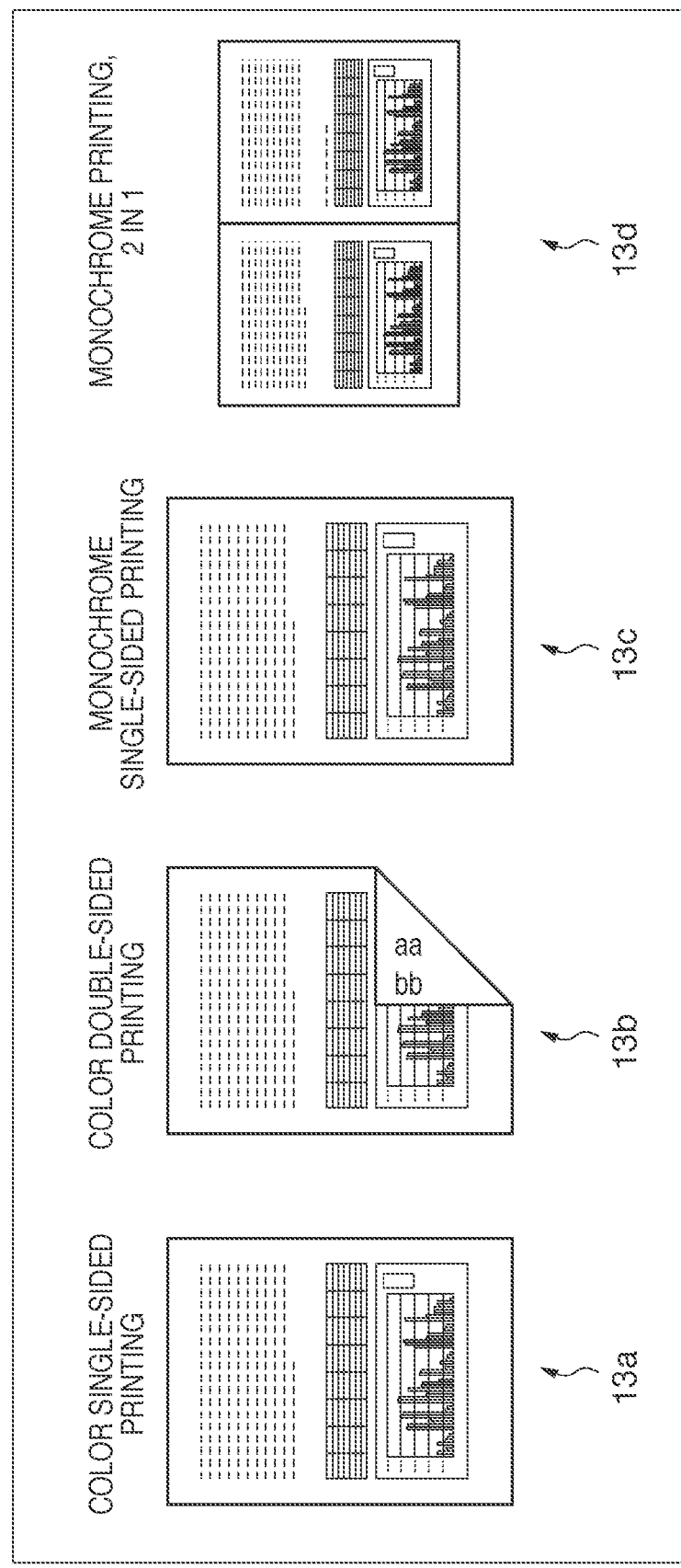

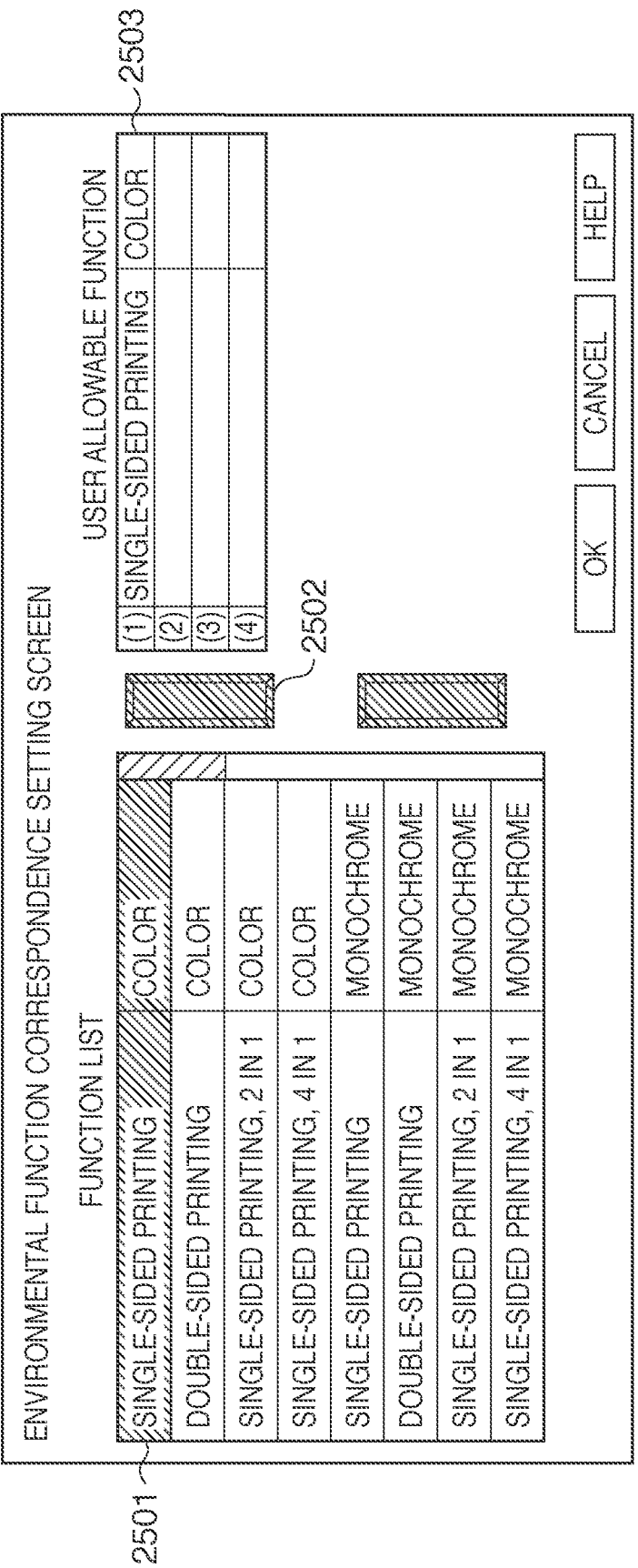

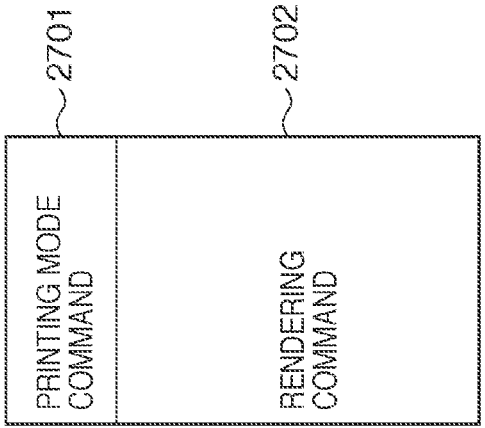

FIG. 15A

| SINGLE-SIDED PRINTING | COLOR | UNEXECUTABLE | FIRST DESIRE |
| DOUBLE-SIDED PRINTING | COLOR | UNEXECUTABLE | SECOND DESIRE |
| SINGLE-SIDED PRINTING, 2 IN 1 | COLOR | UNEXECUTABLE | — |
| SINGLE-SIDED PRINTING, 4 IN 1 | COLOR | EXECUTABLE | — |
| SINGLE-SIDED PRINTING | MONOCHROME | UNEXECUTABLE | THIRD DESIRE |
| DOUBLE-SIDED PRINTING | MONOCHROME | EXECUTABLE | — |
| SINGLE-SIDED PRINTING, 2 IN 1 | MONOCHROME | EXECUTABLE | FOURTH DESIRE |
| SINGLE-SIDED PRINTING, 4 IN 1 | MONOCHROME | EXECUTABLE | — |

| SINGLE-SIDED PRINTING | COLOR | UNEXECUTABLE | FIRST DESIRE |
| --- | --- | --- | --- |
| DOUBLE-SIDED PRINTING | COLOR | UNEXECUTABLE | SECOND DESIRE |
| SINGLE-SIDED PRINTING, 2 IN 1 | COLOR | UNEXECUTABLE | – |
| SINGLE-SIDED PRINTING, 4 IN 1 | COLOR | EXECUTABLE | – |
| SINGLE-SIDED PRINTING | MONOCHROME | UNEXECUTABLE | THIRD DESIRE |
| DOUBLE-SIDED PRINTING | MONOCHROME | EXECUTABLE | – |
| SINGLE-SIDED PRINTING, 2 IN 1 | MONOCHROME | EXECUTABLE | FOURTH DESIRE |
| SINGLE-SIDED PRINTING, 4 IN 1 | MONOCHROME | EXECUTABLE | – |

2901

POWER CONTROL SYSTEM AND CONTROL METHOD FOR THE SAME

BACKGROUND OF THE INVENTION

1. Field of the Invention

The present invention relates to a power control system for controlling the amount of power consumed by an information processing apparatus such as an image forming apparatus and a control method for the same.

2. Description of the Related Art

As conventional power controlling technology, target power control is generally known in which a reference that serves as a target is determined with respect to the power consumed by an apparatus that is driven using a power source, and power control is performed based on this reference. Specifically, this reference value is set using the amount of power consumption that serves as a fixed target with respect to the power consumed by an image forming apparatus. Power saving is realized by causing the image forming apparatus to shift into a power saving mode due to a sleep mode, and adjusting a time for a shift to this mode, based on such a reference. In recent years, there has been a proposal to realize power saving by restricting some functions of the image forming apparatus, based on a reference value set using the amount of power consumption per unit time.

For example, Japanese Patent Laid-Open No. 2007-249563 proposes an information processing apparatus that supports achievement of a use target that has been set for resources such as paper, toner, and power in the case where it is predicted that it is difficult to achieve that target. Power saving is realized by changing a job mode when an operation that uses resources such as paper, toner, and power is executed in the case where it is determined that target achievement is difficult by predicting the amount of such resources to be used. Change of a job mode means change of a mode related to job execution such as, for example, selection of a reuse paper tray or a recycled paper tray aiming at saving paper resources, setting of a toner saving mode, activation of setting for a shift to an energy saving (power saving) mode, or shortening of a time to shift to the power saving mode. Further, Japanese Patent Laid-Open No. 2007-233611 proposes an apparatus that, in the case where a device control command is issued from a computer to an image forming apparatus in a low power consumption state, controls whether or not to allow a command to be issued according to the priority of the command to be issued.

However, the proposal of Japanese Patent Laid-Open No. 2007-249563 does not disclose a method for, if a job mode is changed in order to save power, canceling the changed content after that or changing the mode to another mode. According to the method disclosed therein, a user is merely granted the ability to change of a job mode in the case where that apparatus is used. In other words, if a job mode has been changed, the user cannot further change the changed job mode. Accordingly, for example, in the situation where execution of a specific function is restricted due to control for saving power (power saving control), even if the user desires to execute that function, the function cannot be executed unless the job mode is changed. However, if execution of a job mode desired by the user is to be prioritized over power saving, it is desirable to achieve power saving while allowing a flexible change with respect to a function restricted due to power saving control. Further, the proposal of Japanese Patent Laid-Open No. 2007-233611 has a problem that in the case where a device control command for instructing printing has been issued to an image forming apparatus that has shifted so as to be under power saving control, printing cannot be performed if the priority set for the command is low.

SUMMARY OF THE INVENTION

The present invention has been conceived in view of such problems, and provides technology that enables power saving control in which control content can be changed according to a user selection, in a power control system that saves power consumed by an information processing apparatus.

One aspect of the present invention provides a power control system including an information processing apparatus, a power amount measurement apparatus that measures the amount of power consumption of the information processing apparatus, and a power management apparatus that manages the amount of power consumption of the information processing apparatus, the power management apparatus comprising: an acceptance unit that accepts reference values for the amount of power consumption that are respectively associated with a plurality of control modes for reducing the amount of power consumption of the information processing apparatus and are used for the information processing apparatus to shift to the control modes, where the greater the reference value is, the smaller the amount of power consumption of the control mode associated therewith is, and that accepts power saving settings that are respectively associated with the plurality of control modes and restrict a function that is executable in the information processing apparatus; and a transmission unit that transmits, to the information processing apparatus, the reference values and the power saving settings that are associated with the plurality of control modes and have been accepted by the acceptance unit, and the information processing apparatus comprising: an information reception unit that receives the reference values and the power saving settings that are associated with the plurality of control modes and have been transmitted by the transmission unit; an actual value reception unit that requests the power amount measurement apparatus to measure the amount of power consumed by the information processing apparatus during a predetermined power control period, and receives an actual value of the amount of power that has been consumed by the information processing apparatus during the predetermined power control period, and that has been transmitted from the power amount measurement apparatus in response to the request; a determination unit that determines whether each of the reference values corresponding to the plurality of control modes is less than the received actual value of the amount of power consumption; and a control unit that makes a shift, if one or more reference values determined by the determination unit as being less than the actual value exist, to the control mode corresponding to the greatest reference value among the one or more reference values determined as being less than the actual value, and performs power saving control in accordance with the power saving setting corresponding to the control mode, wherein the control unit further changes, if execution of a job instructed by a user is restricted depending on the power saving setting corresponding to the control mode that is being executed, control content according to the control mode to control content that has been determined as a substitution for the control content and that allows the job to be executed, and executes the job.

Another aspect of the present invention provides a control method for a power control system including an information processing apparatus, a power amount measurement apparatus that measures the amount of power consumption of the information processing apparatus, and a power management apparatus that manages the amount of power consumption of the information processing apparatus, the method comprising: accepting, in the power management apparatus, reference values for the amount of power consumption that are respectively associated with a plurality of control modes for reducing the amount of power consumption of the information processing apparatus and are used for the information processing apparatus to shift to the control modes, where the greater the reference value is, the smaller the amount of power consumption of the control mode associated therewith is, and accepting power saving settings that are respectively associated with the plurality of control modes and restrict a function that is executable in the information processing apparatus; transmitting, in the power management apparatus, the reference values and the power saving settings that are associated with the plurality of control modes and have been accepted in the acceptance to the information processing apparatus; receiving, in the information processing apparatus, the reference values and the power saving settings that are associated with the plurality of control modes and have been transmitted in the transmission; requesting, in the information processing apparatus, the power amount measurement apparatus to measure the amount of power consumed by the information processing apparatus during a predetermined power control period, and receiving an actual value of the amount of power that has been consumed by the information processing apparatus during the predetermined power control period, and that has been transmitted from the power amount measurement apparatus in response to the request; determining, in the information processing apparatus, whether each of the reference values corresponding to the plurality of control modes is less than the received actual value of the amount of power consumption; and performing, in the information processing apparatus, control in which if one or more reference values determined in the determination as being less than the actual value exist, a shift is made to the control mode corresponding to the greatest reference value among the one or more reference values determined as being less than the actual value, and power saving control is performed in accordance with the power saving setting corresponding to the control mode, wherein in the control, if execution of a job instructed by a user is restricted depending on the power saving setting corresponding to the control mode that is being executed, control content according to the control mode is further changed to control content that has been determined as a substitution for the control content and that allows the job to be executed, and the job is executed.

According to the present invention, it is possible to provide technology that enables power saving control in which control content can be changed according to a user selection, in a power control system that saves power consumed by an information processing apparatus.

Further features of the present invention will become apparent from the following description of exemplary embodiments with reference to the attached drawings.

BRIEF DESCRIPTION OF THE DRAWINGS

FIG. 2 is a diagram showing the configuration of an image forming apparatus.

FIG. 4 is a diagram showing a setting screen of an operation unit.

FIG. 8 is a flowchart showing operation performed by the power consumption management apparatus and the image forming apparatus.

FIGS. 12A and 12B are diagrams showing a management table of operation function restrictions in the image forming apparatus and an environmental function correspondence setting screen in a printer driver of a general purpose computer.

FIG. 13 is a diagram showing printing forms desired by a user with respect to the image forming apparatus.

FIGS. 14A and 14B are diagrams showing environmental function correspondence setting screens in the printer driver of the general purpose computer.

FIGS. 15A, 15B and 15C are diagrams showing a transmission command that the general purpose computer transmits to the image forming apparatus and tables for managing operation function restrictions.

DESCRIPTION OF THE EMBODIMENTS

Embodiment 1

Figure 1:
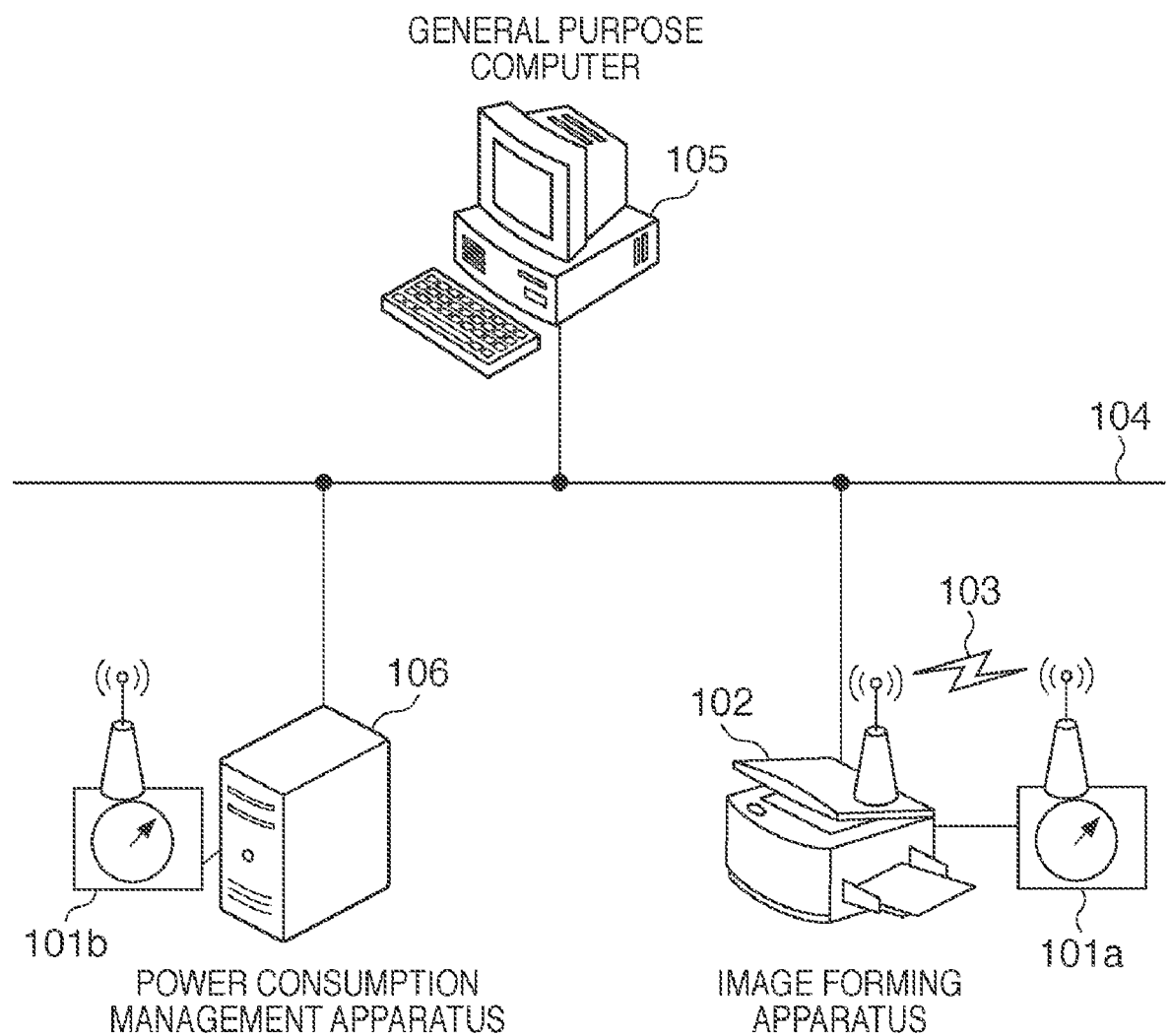
FIG. 1 is a diagram showing the configuration of a power control system.

FIG. 1 is a diagram showing an example of a network system that constitutes a power control system according to the present embodiment. The power control system is provided with an image forming apparatus 102, power consumption amount measurement apparatuses (101a and 101b), a general purpose computer 105, a power consumption management apparatus 106, a wireless communication medium 103, and a wired communication medium 104. The image forming apparatus 102 includes a printer, a multi-function peripheral, a fax machine, and the like. The power consumption amount measurement apparatuses 101a and 101b measure the power consumed by the image forming apparatus 102, and the power consumption management apparatus 106 manages the power consumption of the image forming apparatus 102. In this power control system, the image forming apparatus 102 performs power saving control for saving power with respect to power consumption (hereinafter, also referred to as "energy saving control") using information exchanged with the power consumption amount measurement apparatuses 101a and 101b, the power consumption management apparatus 106, and the general purpose computer 105.

The wireless communication medium 103 and the wired communication medium 104 shown in FIG. 1 are information transmission media that transmit information between devices that construct the network system. With the wireless communication medium 103, for example, multi-hop wireless communication is performed, and direct connection or relay connection is performed. With this communication, the image forming apparatus 102 performs mutual information transmission with the power consumption management apparatus 106 and the power consumption amount measurement apparatus 101.

Information transmission media are not limited to the wireless communication medium 103 and the wired communication medium 104, and other information transmission media may be used as long as information transmission equivalent to that performed by these is possible. The power consumption amount measurement apparatuses 101a and 101b are illustrated as being disposed outside the image forming apparatus 102. However, there is no limitation to the example shown in the diagram, as long as power consumption of the image forming apparatus 102 can be measured and information on measured values can be received. For example, the image forming apparatus 102 may contain the functions of the power consumption amount measurement apparatus.

The image forming apparatus 102 receives information on power consumption from the power consumption amount measurement apparatus 101. Further, the image forming apparatus 102 receives, from the power consumption management apparatus 106, information on a power saving control period indicating a unit of a period in which power saving control is executed and a target value for target power control, and instruction information related to power saving control together with print data from the general purpose computer 105. The image forming apparatus 102 implements target power consumption control based on such received information and power saving control settings set by an operation unit.

FIG. 2 is a diagram showing the configuration of the image forming apparatus 102 in the power control system of the present embodiment, and also showing the configuration of a controller unit 1200 that plays a main role of power saving control and performs digital data processing. The controller unit 1200 is connected to a scanner 10 serving as an image reading device, and a printer 20 serving as an image output device. Further, the controller unit 1200 performs communication control and inputs/outputs images and information on the amount of power consumption between the image forming apparatus and the general purpose computer 105, the power consumption amount measurement apparatus 101, and other devices, by being connected via a LAN 3300 and a wireless connection 1252.

A CPU 1201 is a controller that performs overall control of the system. A RAM 1202 is a system work memory for the CPU 1201 to operate, and is also an image memory for temporarily storing image data. A ROM 1203 is a boot ROM in which a boot program of the system is stored. An HDD 1204 is a hard disk drive, and stores system software, image data, a software counter value, a target amount of power consumption, information on the amount of power consumption received from the power consumption amount measurement apparatus 101, and so on. A value obtained by counting the number of image outputs is stored as the software counter value. A counter value may be held in a storage region in an EEPROM or the like (not shown) as long as storage content can be held even if a power source is cut off, rather than being limited to being held in the HDD 1204.

An operation unit I/F 1206 is an interface that connects an operation unit 140 that provides a user interface to the controller unit 1200, and outputs image data to be displayed on the operation unit 140 to the operation unit 140. Further, the operation unit I/F 1206 transmits information input by the user of this system from the operation unit 140 to the CPU 1201.

A network I/F 1210 connects the controller unit 1200 to the LAN 3300, and inputs/outputs various data related to an output image, and information related to device control. Further, due to an input operation performed on the operation unit 140, the network I/F 1210 can receive output image data from the general purpose computer 105 and an apparatus that manages external output image data (not shown) on a network, and can perform image output, according to the input operation performed on the operation unit 140.

A wireless communication I/F 1270 connects a digital camera (not shown), a PC (not shown), a peripheral device such as the power consumption amount measurement apparatus, which are connected by wireless connection, to the controller unit 1200. The wireless communication I/F 1270 inputs/outputs various data related to an output image and information related to device control. A scanner/printer communication I/F 1208 is an interface for communicating with both of the CPUs of the scanner 10 and the printer 20. A timer 1211 functions as a timer that issues time settings and issues interrupts at fixed intervals, with respect to the image forming apparatus 102 and the controller unit 1200. The above devices are disposed on a system bus 1207.

An image bus I/F 1205 is a bus bridge that connects an image bus 2008 that transfers image data at high speed to the system bus 1207, and converts a data structure. The devices below are disposed on the image bus 2008.

A raster image processor (RIP) 1260 expands PDL code into a bitmap image. A device I/F 1220 connects the scanner 10 and the printer 20 serving as image input/output devices to the controller unit 1200, and performs synchronous/asynchronous conversion of image data. A scanner image processing unit 1280 corrects, manipulates, and edits input image data. A printer image processing unit 1290 performs correction, resolution conversion, and the like on print output image data. An image rotation unit 1230 rotates image data. An image compression unit 1240 performs compression/decompression processing using JPEG on multi-value image data, and performs compression/decompression processing using JBIG, MMR, MH or the like on binary image data.

The image forming apparatus 102 is provided with a sleep mode for power saving. The CPU 1201 controls a shift of the operational mode to this sleep mode. In other words, the CPU 1201 can determine the running state of the image forming apparatus 102, and independently control blockage and supply of power supply for the printer 20, the scanner 10, the operation unit 140, and the like.

For example, in the case where only a scanner function is used, the CPU 1201 blocks power supply to the printer 20 and the printer image processing unit 1290. On the other hand, in the case where only a printer function is used, the CPU 1201 reduces power consumption by blocking power supply to unnecessary portions, such as the operation unit 140, the scanner 10, and the scanner image processing unit 1280. In this way, the CPU 1201 of the controller unit 1200 controls power supply in a smaller unit, thereby realizing power saving.

Figure 3A:
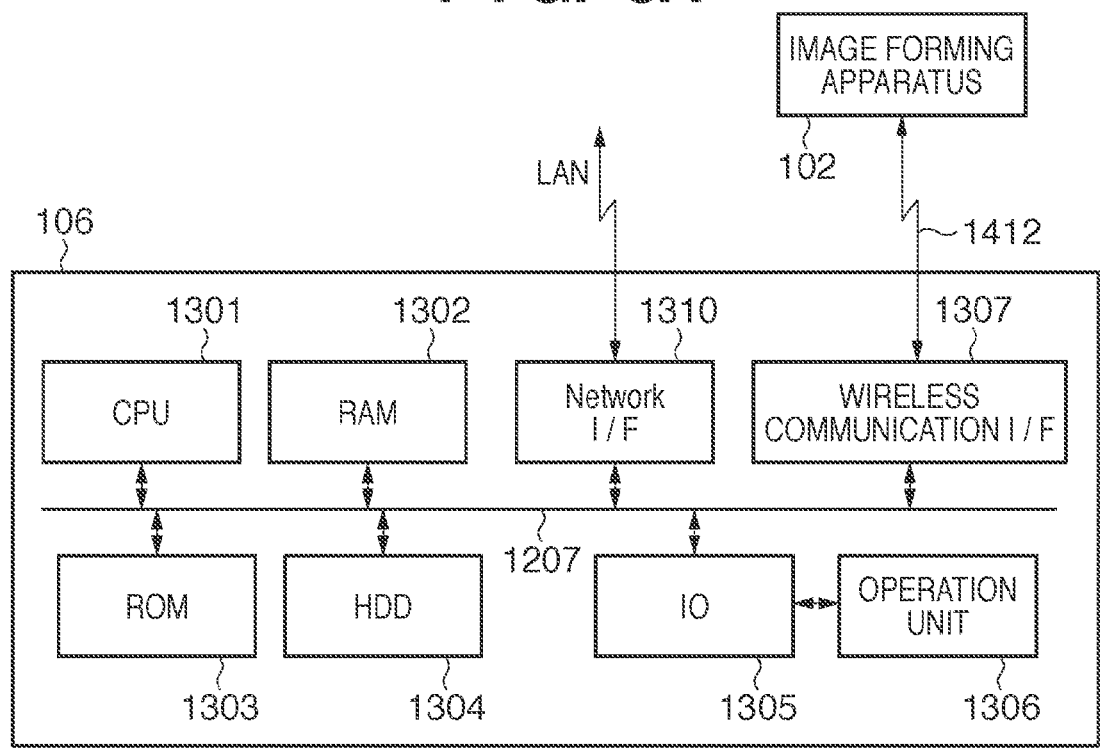
FIGS. 3A and 3B are diagrams showing the configurations of a power consumption management apparatus and a power consumption amount measurement apparatus.

FIG. 3A shows a diagram showing the configuration of the power consumption management apparatus 106. The power consumption management apparatus 106 manages the amount of power consumption, and a target amount of power consumption. A CPU 1301 performs overall control of the power consumption management apparatus 106 by executing a control program. A RAM 1302 is a system work memory for the CPU 1301 to operate. A ROM 1303 serves as a boot ROM, in which a boot program of the system is stored.

An HDD 1304 is a hard disk drive that stores system software, a target amount of power consumption, the amount of power consumption received from the image forming apparatus 102 (FIG. 1), and the like. A network I/F 1310 is a LAN connection I/F that is an interface for connection with external devices via a wired LAN. A wireless communication I/F 1307 is an interface for performing wireless communication with the image forming apparatus 102, receives information on the amount of power consumption, and transmits the target amount of power consumption, for instance. An IO 1305 is an interface that inputs/outputs information from/to an operation unit 1306 including input/output devices (not shown) such as a liquid crystal display and a mouse. The power consumption management apparatus 106 can accept, via the operation unit 1306, input with regard to various setting instructions such as settings for the target amount of power consumption in the power control system.

As described above, the configuration of the power consumption management apparatus 106 is based on a general purpose computer. However, the configuration thereof is not limited to the configuration described above, as long as it enables management of the amount of power consumption and acceptance of setting input instructions such as a target amount of power consumption in the power control system of the present embodiment. For example, one of the image forming apparatuses 102 that constitute the power control system shown in FIG. 2 may play that role.

Figure 3B:
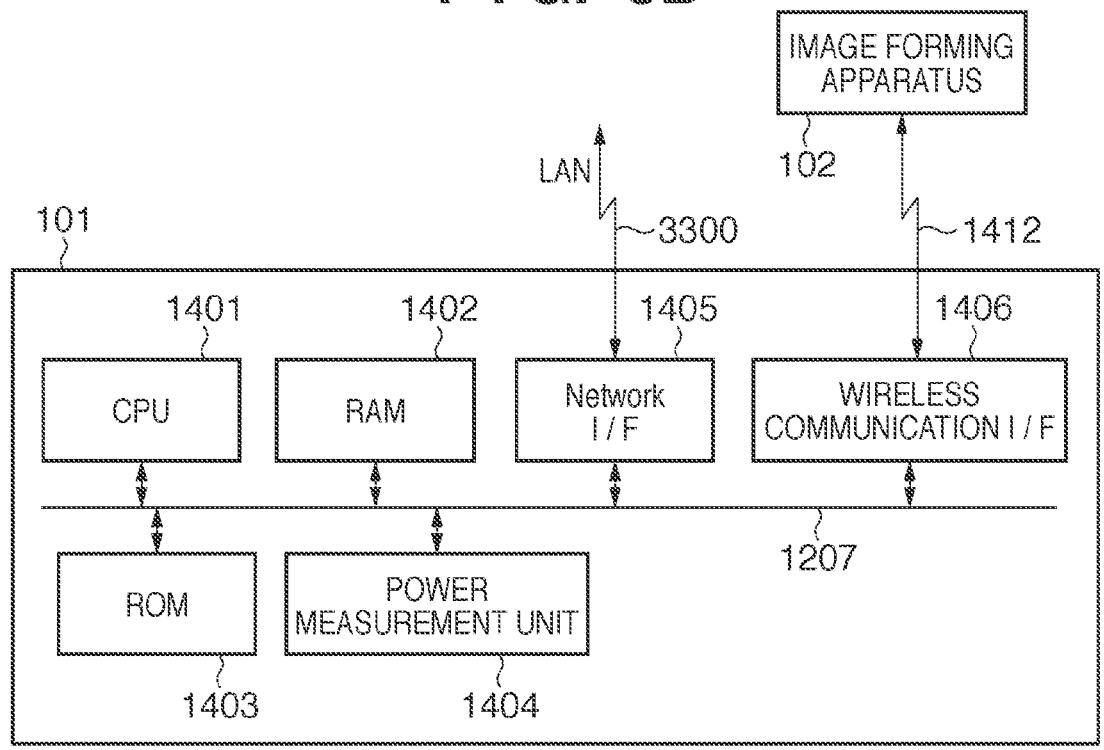

FIG. 3B shows a diagram showing the configuration of the power consumption amount measurement apparatus 101 according to the present embodiment. The power consumption amount measurement apparatus 101 measures the amount of power consumption, and transmit the measurement results. A CPU 1401 performs overall control of the power consumption amount measurement apparatus 101 such as measurement of power consumption and measurement result transmission control by executing a control program. A RAM 1402 is a system work memory for the CPU 1401 to operate.

Power is supplied to the image forming apparatus 102 (FIG. 1) via a power amount measurement unit 1404 of the power consumption amount measurement apparatus 101. The power amount measurement unit 1404 directly measures the power on the primary side supplied by the power source for the image forming apparatus 102. The CPU 1401 stores information on the amount of power consumption, which is the result of this measurement, or the like, in the RAM 1402. A ROM 1403 is a boot ROM, in which a boot program of the system and system software are stored.

A network I/F 1405 is an interface for connection with the LAN 3300, and is an interface for connecting with an external device via a wired LAN. A wireless communication I/F 1407 is an interface for performing wireless communication with the image forming apparatus 102 (FIG. 1), and transmits information on the amount of power consumption in response to a request from the image forming apparatus 102, for instance. Note that transmission and reception of information to/from the image forming apparatus 102 may be performed via the network I/F 1405, rather than wireless communication that is shown.

The external power consumption amount measurement apparatus 101 that can communicate with the image forming apparatus 102 has been described with reference to the diagram shown in FIG. 3B. However, there is no limitation to the example of the configuration shown in FIG. 3B as long as the amount of power consumption of the image forming apparatus 102 can be measured, and for example, the image forming apparatus 102 may be internally provided with a power consumption amount measurement unit having a function of measuring the amount of power consumption.

In FIG. 4, 4*a* shows a diagram showing an example of a target power consumption amount setting screen 1500 on the screen of the operation unit 1306 of the power consumption management apparatus 106. The shown operation screen includes an input field 1501 for a target amount of power consumption of the entire system, and an input field 1502 for a target power control period in which power saving of the entire system is controlled. The values input in the input fields are used as inputs for calculating a target value of the amount of power consumption of an individual device (image forming apparatus), as power control parameters of the entire system.

In FIG. 4, 4*b* shows a diagram showing an example of a power saving control reference value setting screen 1600 on the screen of the operation unit of the image forming apparatus 102 or the power consumption management apparatus 106. The shown operation screen is for setting a power amount reference value with respect to the amount of power consumption of the image forming apparatus 102, and includes reference value input fields 1601, 1602, and 1603 corresponding to control modes A, B, and C.

For the input in this screen, the amount of power to be consumed may be directly input as shown by 4*b* in FIG. 4. Here, input values 7 kWh, 5 kWh, and 3 kWh respectively correspond to the control modes A, B, and C. These values are power amount reference values at which energy saving control is started with respect to the amount of power consumption during a determined control period (for example, one day). In other words, the control mode C is a mode for achieving the highest degree of energy saving effect, whereas the control mode A is a mode for achieving the lowest degree thereof. The control mode B is a control mode for achieving the second highest degree of energy saving effect, following the control mode C. In the image forming apparatus 102, if the accumulated value of the amount of power consumption has reached the power amount reference value input in this input field, power saving control corresponding to the reference value described later is performed.

Further, as shown in input fields 1605, 1606, and 1607 shown by 4*c* in FIG. 4, a reference value may be input as a percentage (%) for the amount of power consumption per unit time obtained based on the target amount of power consumption and the control period that have been input in the screen shown by 4*a*. In other words, for example, if power consumption per hour is 10 kWh with respect to 300 kWh shown by 4*a* in FIG. 4, energy saving control will be started when 70% of the power, specifically 7 kWh, is consumed in the control mode A. Further, in the example in the diagram, although one reference is provided for individual groups A, B, and C, the number of references for each group is not limited to one, and two or more references may be provided.

Figure 5:
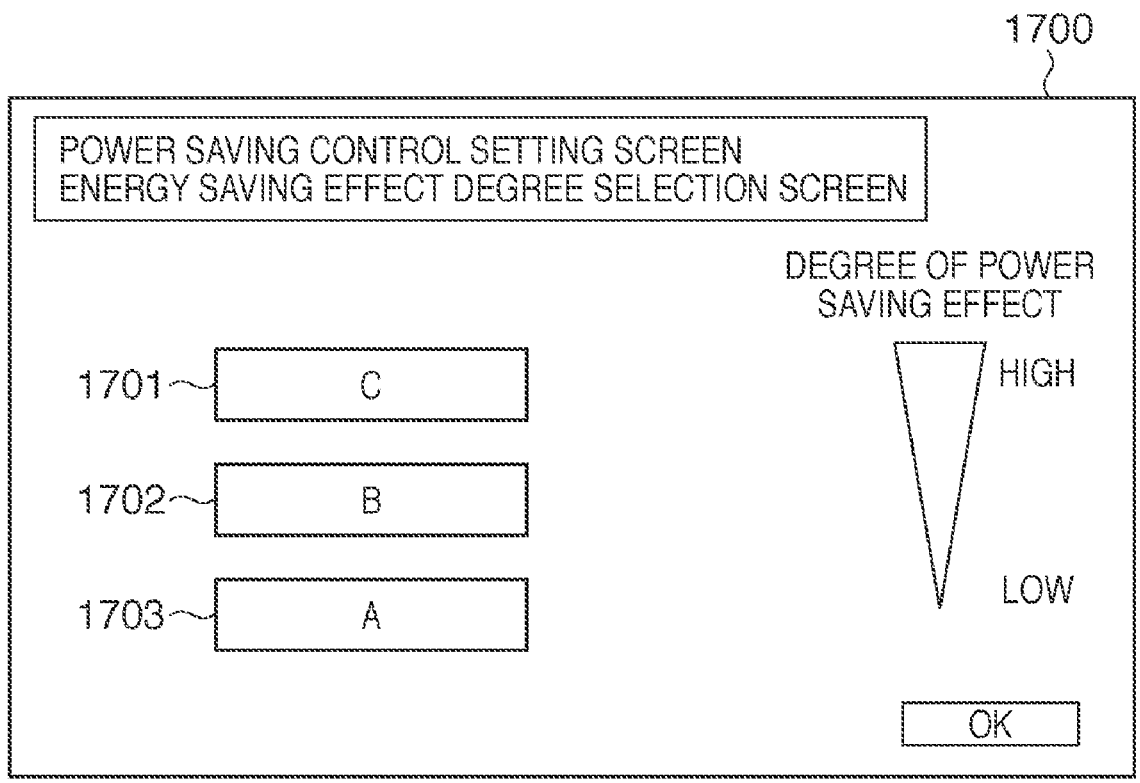
FIG. 5 is a diagram showing a power saving control selection screen.

FIG. 5 is a diagram showing an example of a power saving control setting instruction screen displayed on the operation unit of the image forming apparatus 102 or the power consumption management apparatus 106. The instruction screen shown in FIG. 5 is for instructions and settings with regard to the content of power saving control corresponding to the reference value for power consumption shown by 4*c* in FIG. 4. Specifically, content of power saving control in the default state of the apparatus is instructed and set using this screen. For example, three reference values A, B, and C for the amount of power consumption are provided, and power saving control for achieving different energy saving effects is associated with the reference values. The content of power saving control may be assigned such that the energy saving effect increases in the order of the control modes A, B, and C.

An energy saving effect degree selection screen 1700 is a screen for selecting a control mode corresponding to a reference A, B, or C whose control content is to be instructed. The screen is caused to transition to a screen for setting details of control content for the control mode by pressing a corresponding button.

Figure 6A:
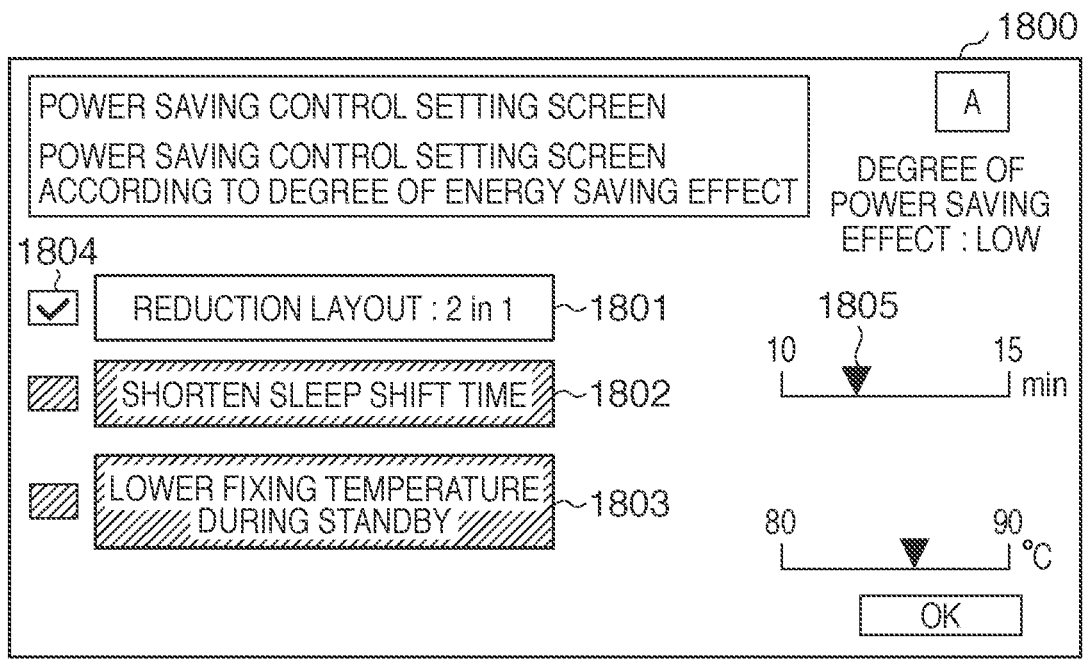
FIGS. 6A, 6B and 6C are diagrams showing power saving control setting screens according to the degree of energy saving effect.

FIG. 6A shows a diagram showing an example of a power saving control setting screen according to the degree of energy saving effect displayed on the operation unit of the image forming apparatus 102 or the power consumption management apparatus 106. FIG. 6A shows an example of the screen displayed in the case where a selection button 1703 with regard to the reference A has been pressed in the energy saving effect degree selection screen 1700 illustrated in FIG. 5. In other words, FIG. 6A shows an example of a screen for setting control content with regard to power saving control for the "low" degree of energy saving effect, specifically, the lowest energy saving effect in this example.

As shown in the diagram, this screen includes display fields for the name of power saving control items and check boxes for enabling the items. Specifically, the screen includes a display field showing a "reduction layout: 2 in 1" item 1801 and a check box 1804 for enabling the item. Further, the screen includes a time setting field 1805 for setting a time period using a slider for setting a "shorten sleep shift time" item 1802. In the case of this example, a setting within the limited range of 10 to 15 minutes can be made. A "lower fixing temperature during standby" item 1803 is also provided with a temperature setting field for setting a fixing temperature during standby similarly using a slider. In the case of this example, a setting within the limited range of 80° C. to 90° C. can be made.

There is a dependency relationship between the energy saving effects to be expected and a selected item or the number of selected items. Accordingly, for example, in the case of the power saving control setting screen for the low degree of energy saving effect shown in FIG. 6A, it is assumed that an expected value of power saving control is reached by selecting one of the three items. In this case, operability is realized such that at the point in time when a check is put in a check box, other selection items are made unselectable by being grayed out. In other words, this enables a user to easily grasp the number of items that need to be selected from among the displayed power saving control items. Settings of the power saving control set in this way are recorded in the RAM 1202 of the image forming apparatus 102 or the RAM 1302 of the power consumption management apparatus 106 as default settings.

Figure 6B:
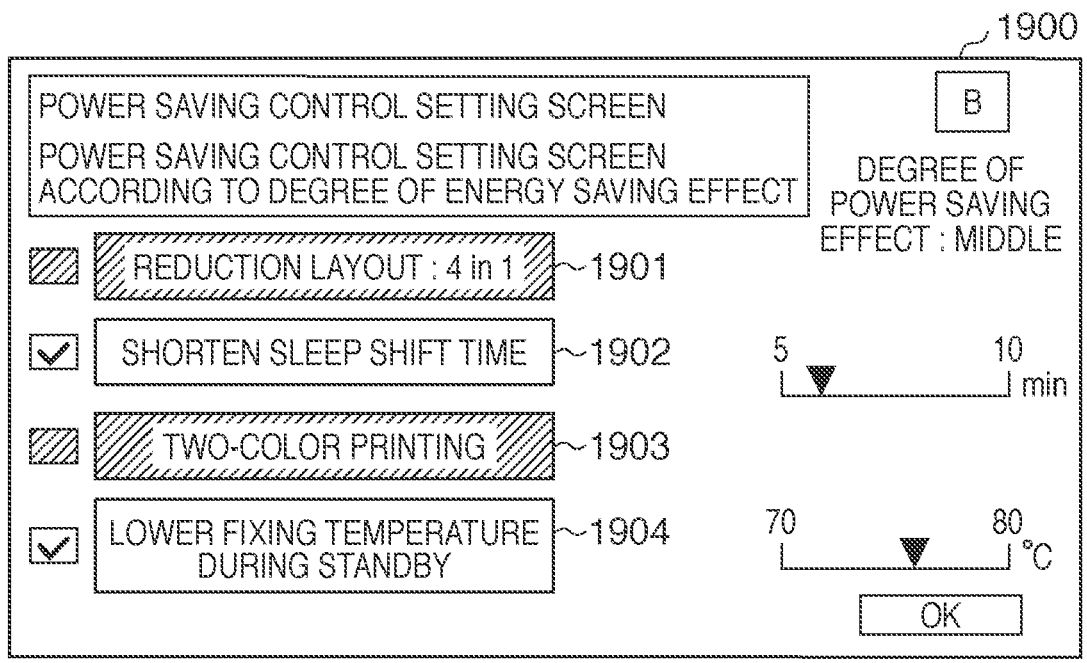

FIG. 6B shows an example of a screen displayed in the case where a selection button 1702 with regard to the control mode B has been pressed in the energy saving effect degree selection screen 1700 in FIG. 5. In other words, this screen is a screen in the case of selecting power saving control for the "middle" degree of energy saving effect. In this example, a "shorten sleep shift time" item 1902 for reducing power consumption and a "lower fixing temperature during standby" item 1904 are selected. With respect to this selection, a "reduction layout: 4 in 1" item 1901 and a "two-color printing" item 1903 for reducing power consumption are grayed out and made unselectable, as can be expected. This shows, as described in the previous example, due to two selected power saving items (power saving settings) for power saving control, the expected value of power saving control as the "middle" energy saving effect is reached. Further, a setting field with a certain range of width such as a filed for a sleep shift time and a fixing temperature can be set such that a selectable range differs according to the degree of energy saving effect, thereby adjusting the degree of energy saving effect. In this way, power saving settings correspond to settings for restricting functions that can be executed by the image forming apparatus 102.

Figures 6C, 7:
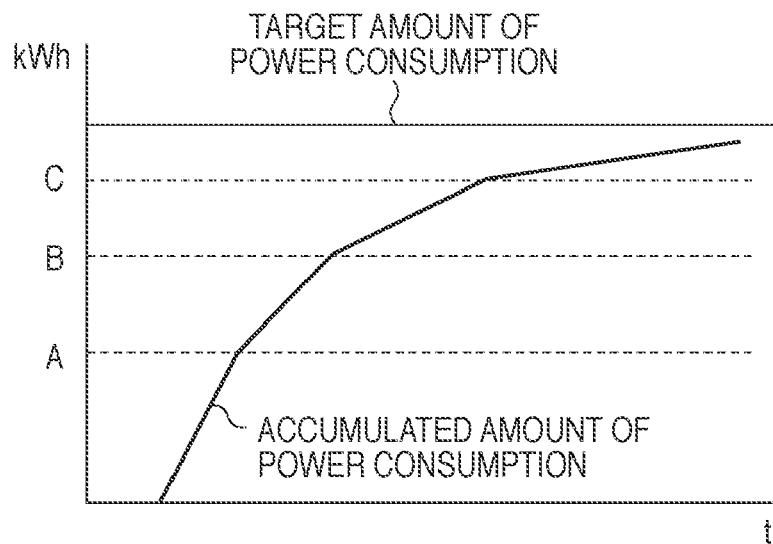
FIG. 7 is a diagram showing the relationship between the amount of power consumption and reference values.

Moreover, FIG. 6C shows an example of the screen displayed in the case where a selection button 1701 with regard to the control mode C has been pressed in the energy saving effect degree selection screen 1700 in FIG. 5. This screen is a screen in the case where power saving control for the "high" degree of energy saving effect, which achieves the greatest effect, has been selected. In this example, a "shorten sleep shift time" item 2002, a "monochrome printing" item 2003, and a "print at half speed" item 2005 are selected, and other items, specifically, a "reduction layout: 8 in 1" item 2001 and a "lower fixing temperature during standby" item 2004 are grayed out. If the degree of energy saving effect is high, as in the diagram, control content more effective than "middle", which is the second highest degree of energy saving effect, is set with respect to power saving control items and the number thereof or a setting range. Further, for the control mode for the "middle" degree of energy saving effect, control content more effective than the "low" energy saving effect subsequent thereto is set.

In this way, although the power saving control setting screens according to the degree of energy saving effect have been described, the power saving items themselves for power saving control are not limited to this example, and other setting items may be adopted as long as the items have the energy saving effect. In other words, the power saving control setting screens need to present options as power saving control items or setting ranges with respect to a requested degree of energy saving effect. It is sufficient if the power saving control setting screen is a screen that provides operability such that the user selectively makes settings from the presentation, and as a result, power saving control with which the expected energy saving effect can be obtained is set.

FIG. 7 shows an example of a graph showing a relationship between the accumulated amount of power consumption of the image forming apparatus 102 (FIG. 1) and the reference values. The reference values "A", "B", and "C" and the "target amount of power consumption" shown in the diagram correspond to the setting values set in FIG. 4. Further, power saving control corresponding to the reference values "A", "B", and "C" is performed in accordance with the power saving items for power saving control set in the screens shown in FIGS. 5 and 6A to 6C described above and the setting values thereof.

In the power control system, it is possible to control a change in the amount of power consumption as shown in FIG. 7. In other words, a shift is made to power saving control for a higher energy saving effect (less amount of power consumption) each time the accumulated value of the amount of power consumption reaches the power amount reference value set according to the target amount of power consumption so as to achieve a greater power saving effect. In this way, the slope of the accumulated amount of power consumed by the image forming apparatus 102 relative to a time-axis "t" can be controlled, and the power saving effect due to power saving control can be changed with time. In the present embodiment, the reference values shown in FIG. 7 are reference values with respect to the amount of power consumption at which the image forming apparatus 102 shifts to the control modes, and the greater the reference value is, the smaller the amount of power consumption of the control mode associated therewith is.

FIG. 8 shows an example of an operation flow of the image forming apparatus 102 and the power consumption management apparatus 106 in the power control system. In particular, mutual cooperative operation including transmission and reception of information on a target amount of power consumption and the like between the image forming apparatus 102 and the power consumption management apparatus 106 will also be described.

First, in the power consumption management apparatus 106, in S1806, the CPU 1301 (FIG. 3A) accepts settings of a target power control period and a target amount of power consumption showing the upper limit of the amount of power consumption in the power control system during that period via the input field 1501 in the target power consumption amount setting screen 1500 shown by 4a in FIG. 4. After that, the CPU 1301 records the result in the RAM 1302 and the HDD 1304. Next, in S1807, the CPU 1301 accepts settings for a reference value via the input field in the power saving control reference value setting screen 1600 shown by 4b in FIG. 4, and records the settings in the RAM 1302 and the HDD 1304.

In S1808, the CPU 1301 accepts settings of power saving control content according to the degree of power saving effect, corresponding to the reference value input in FIG. 4, shown in FIGS. 5 and 6A to 6C, and records the settings in the RAM 1302 and the HDD 1304. In S1809, the CPU 1301 accepts detailed conditions for obtaining a target amount of power consumption of the image forming apparatus 102 that performs power saving control via an input screen (not shown), and records the conditions in the RAM 1302 and the HDD 1304.

Next, in S1810, the CPU 1301 creates information in which a target amount of power consumption per unit time and power amount reference values respectively associated with the plurality of control modes and control content (power saving settings) thereof are associated as power saving control information to be transmitted to and set in the individual image forming apparatus 102. Then, the CPU 1301 records the created power saving control information in the RAM 1302 and the HDD 1304. In S1811, the CPU 1301 reads the power saving control information from the RAM 1302 and the HDD 1304, and transmits the read information to the image forming apparatus 102 via the wireless communication I/F 1307.

In the image forming apparatus 102, in S1801, the CPU 1201 (FIG. 2) receives the power saving control information transmitted from the power consumption management apparatus 106, and records the received information in the RAM 1202 and the HDD 1204. Next, in S1802, the CPU 1201 implements target power consumption control based on the received power saving control information. Here, target power consumption control is power control for causing the amount of power consumption of the image forming apparatus 102 during a predetermined target power control period to be a target amount of power consumption or less, utilizing power saving control with different energy saving effects. Next, in S1803, the CPU 1201 determines whether or not one day has elapsed. If the CPU 1201 determines that one day has elapsed, in S1804, the CPU 1201 transmits an actual value of the amount of power consumption that the image forming apparatus 102 has received from the power consumption amount measurement apparatus 101, to the power consumption management apparatus 106 (actual value transmission unit). If it is determined in S1803 that one day has not elapsed, the CPU 1201 repeats the procedure in S1802. In this way, in the present embodiment, the image forming apparatus 102 executes target power consumption control in a unit of one day as an example. Further, in S1805, the CPU 1201 determines whether or not 30 days corresponding to the control period set in S1806 have elapsed, and if it is determined that 30 days have elapsed, processing ends. The image forming apparatus 102 repeats the procedure in steps S1801 to S1805 for the period of 30 days.

In the power consumption management apparatus 106, in S1812, the CPU 1301 receives the actual values of the amount of power consumption from other image forming apparatuses including the image forming apparatus 102, and records the values in the RAM 1302 and the HDD 1304. Next, in S1813, the CPU 1301 calculates a target amount of power consumption with respect to the remaining period of the control period for target power consumption control based on the actual value of the amount of power consumption of the entire network system. Specifically, the CPU 1301 calculates a new target amount of power consumption for that remaining period by subtracting the received actual value of the amount of power consumption from the target amount of power consumption. Moreover, the CPU 1301 sets new power amount reference values respectively corresponding to the plurality of control modes for the remaining period, according to the calculated target amount of power consumption.

In S1814, the CPU 1301 determines whether or not the control period (30 days in the present embodiment) for target power consumption control has elapsed. If it is determined that the control period has not elapsed, the CPU 1301 repeats the procedure in steps S1811 to S1814, and transmits the power amount reference value for the remaining period set in S1813 to the image forming apparatus 102. The image forming apparatus 102 performs energy saving control based on the received power amount reference value for the remaining period. The CPU 1301 ends target power consumption control if it is determined that the control period has elapsed.

Figure 9:
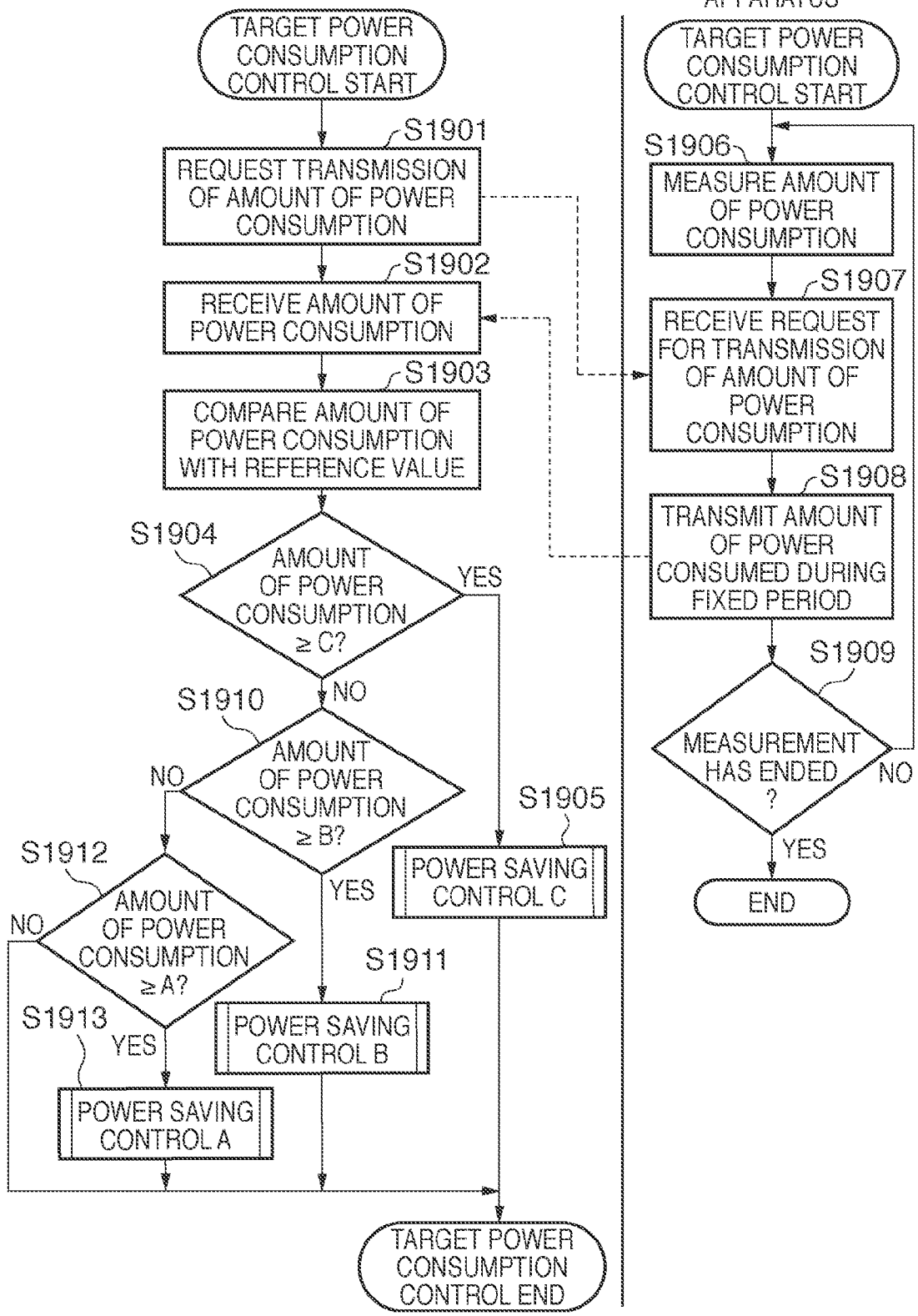
FIG. 9 is a flowchart showing operation performed by the image forming apparatus and the power consumption amount measurement apparatus.

FIG. 9 shows an example of the operational flow of the image forming apparatus 102 (FIG. 1) and the power consumption amount measurement apparatus 101 (FIG. 1) in the power control system. In particular, mutual cooperative operation including transmission and reception of information on a power consumption value and the like between the target power consumption control flow in the image forming apparatus 102 and that in the power consumption amount measurement apparatus 101 will also be described.

In the power consumption amount measurement apparatus 101, the amount of power consumption of the image forming apparatus 102 for the fixed period is measured in the power amount measurement unit 1404 (FIG. 3B). In S1906, the CPU 1401 (FIG. 3B) stores the measured value in the RAM 1402. Next, in S1907, the CPU 1401 receives a measurement request (transmission request) for the amount of power consumption from the image forming apparatus. In S1908, the CPU 1401 reads information on the amount of power consumption recorded in the RAM 1402, and transmits the read information to the image forming apparatus 102. In S1909, the CPU 1401 determines whether or not to end measurement. The CPU 1401 repeats steps S1906 to S1908 if it is determined that measurement is not to be ended.

On the other hand, in the image forming apparatus 102, as target power consumption control in step S1802 shown in FIG. 8, first, in S1901, the CPU 1201 transmits a measurement request (transmission request) to measure the amount of power consumption to the power consumption amount measurement apparatus 101. Next, in S1902, the CPU 1201 receives information with regard to the actual value of the amount of power consumption transmitted from the power consumption amount measurement apparatus 101 in response to the transmission request. Moreover, in S1902, the CPU 1201 adds the received actual value of the amount of power consumption to the sum total of the amount of power consumption accumulated by executing step S1802 in FIG. 8, and records the result in the RAM 1302 and the HDD 1304.

Next, in S1903, the CPU 1201 compares the sum total of the amount of power consumption recorded in the RAM 1302 and the HDD 1304 with the target values (reference values A to C) for the amount of power consumption set via the power consumption management apparatus 106. Specifically, the CPU 1201 determines whether or not reference values (reference values A to C) respectively corresponding to the plurality of control modes (control modes A to C) are smaller than the actual value of the amount of power consumption. Note that this actual value of the amount of power consumption corresponds to the above sum total of the amount of power consumption. If there is a reference value determined as being less than the actual value of the amount of power consumption, the CPU 1201 shifts the mode to a control mode corresponding to the greatest reference value among the reference values. Moreover, the CPU 1201 performs power saving control in accordance with power saving settings corresponding to the control mode.

First, in S1904, the CPU 1201 compares the actual value of the amount of power consumption with the reference value C corresponding to the control mode C, which has been set in the screen shown by 4b or 4c in FIG. 4. If the amount of power consumption is greater than or equal to the reference value C, the CPU 1201 makes a shift to the power saving control C based on the control content set in the screen shown in FIG. 6C, and executes energy saving control. On the other hand, if the amount of power consumption is less than the reference value C, in S1910, the CPU 1201 compares the amount of power consumption with the reference value B corresponding to the control mode B. If the amount of power consumption is greater than or equal to the reference value B, in S1911, the CPU 1201 executes the power saving control B based on the control content set in the screen shown FIG. 6B. If the amount of power consumption is less than the reference value B, the CPU 1201 compares the amount of power consumption with the reference value A. If the amount of power consumption is greater than or equal to the reference value A, in S1913, the CPU 1201 executes the power saving control A based on the control content set in the screen shown in FIG. 6A. If the amount of power consumption is less than the reference value A, the CPU 1201 does not perform power saving control, and ends target power control.

Figure 10:
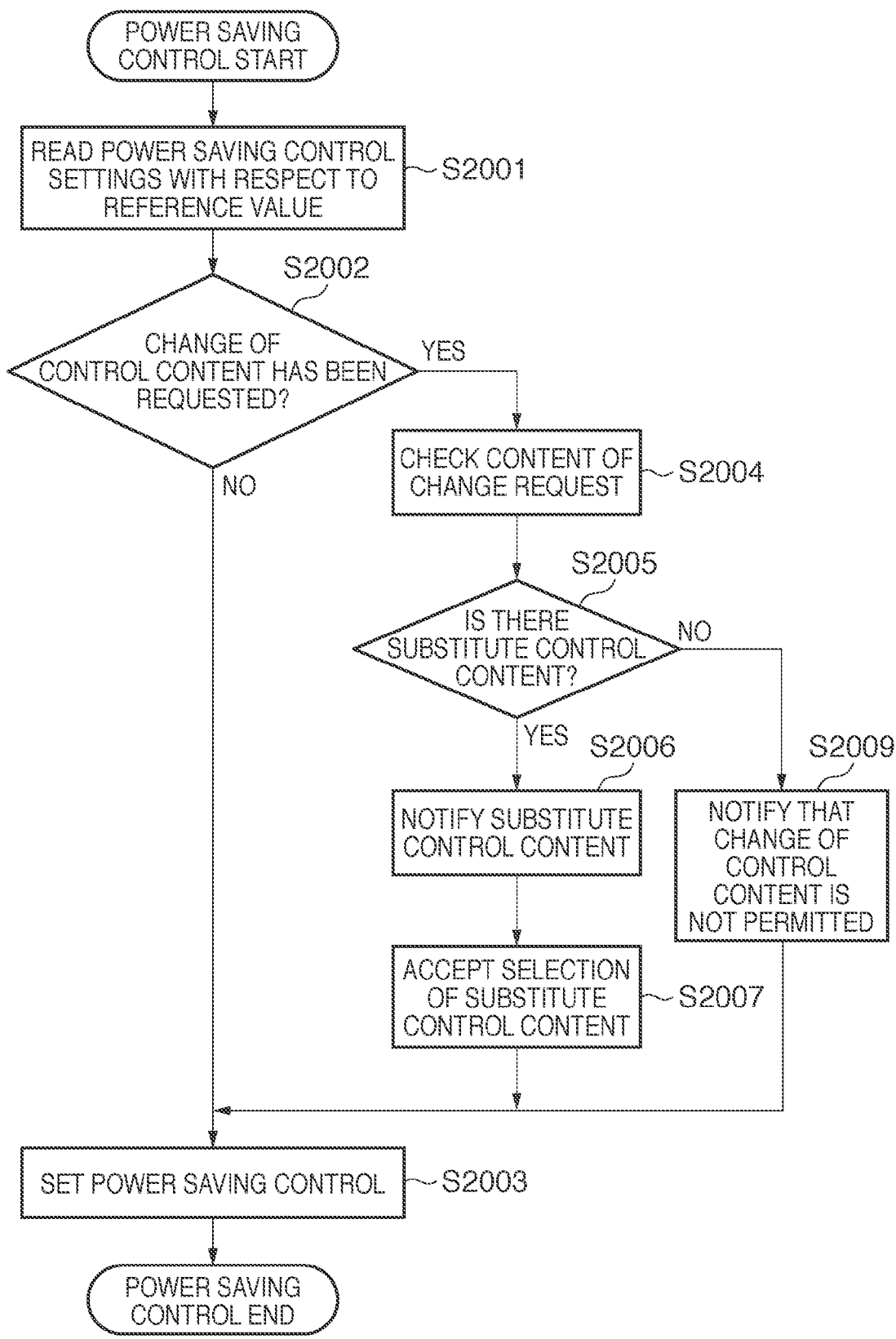
FIG. 10 is a diagram showing a power saving control flow.

FIG. 10 shows an example of a power saving control flow in the power control system. This power saving control flow corresponds to the procedure of the power saving control A to C in S1905, S1911, and S1913 in the flowchart in FIG. 9. If execution of a job is to be restricted depending on power saving settings corresponding to the control mode (one of power saving control A to C) that is being executed, the image forming apparatus 102 changes the control content based on that control mode so as to be control content that allows the job to be executed, and executes the job. In the present embodiment, as described below, in particular, power saving settings corresponding to the control mode that is being executed are changed so as to be settings that have been determined as the substitution for the power saving settings and that allow the job to be executed, and the job is executed.

In the image forming apparatus 102, first, in S2001, the CPU 1201 (FIG. 2) reads power saving control settings (power saving settings) corresponding to the reference values A, B, and C from the RAM 1202. Settings that are read are used in the respective steps based on the reference values. Next, in S2002, the CPU 1201 determines whether there is a change request with respect to the control content indicated by the settings read from the RAM 1202. Here, specifically, whether there is a request to change control content is determined based on whether or not a request to change the control content has been accepted when accepting a user instruction with regard to a job by the operational mode being set via the operation unit, or the like.

If there is no change request in S2002, in S2003, the CPU 1201 makes settings based on the power saving settings read in S2001. If there is a change request in S2002, in S2004, the CPU 1201 checks the content of the change request, and records the content in the RAM 1202 and the HDD 1204. Next, in S2005, the CPU 1201 determines whether there is substitute control content corresponding to the change request.

In the present embodiment, specifically, substitute control content indicates control content of items other than the selected item that are displayed as options on the screens showing the power saving control content (power saving settings) according to the degree of energy saving effect shown in FIGS. 6A to 6C. In other words, it is determined whether there are settings that can be the substitution for the requested change content among the other items. If there is a power saving control item that can be the substitution, in S2006, the CPU 1201 notifies that there is a substitute control item. For example, the CPU 1201 performs notification by displaying candidates of the control items to which a change can be made as a substitution on the screen of the operation unit 140 (FIG. 2). On the other hand, if there is no substitute power saving control content, in S2009, the CPU 1201 does not permit a change, and notifies that fact by displaying the fact on the screen of the operation unit 140.

After the substitute control content has been notified in S2006, in S2007, the CPU 1201 accepts the selection of the candidates for the control content that can be the substitution, and records the selected control content in the RAM 1202 and the HDD 1204 as substitute settings. Further, a configuration may be adopted in which it is possible to select, as default setting, whether power saving control accepted via the acceptance screen, which accepts selection of the substitute control content in S2007, is to be set as a substitute setting or a temporary setting.

Figure 11A:
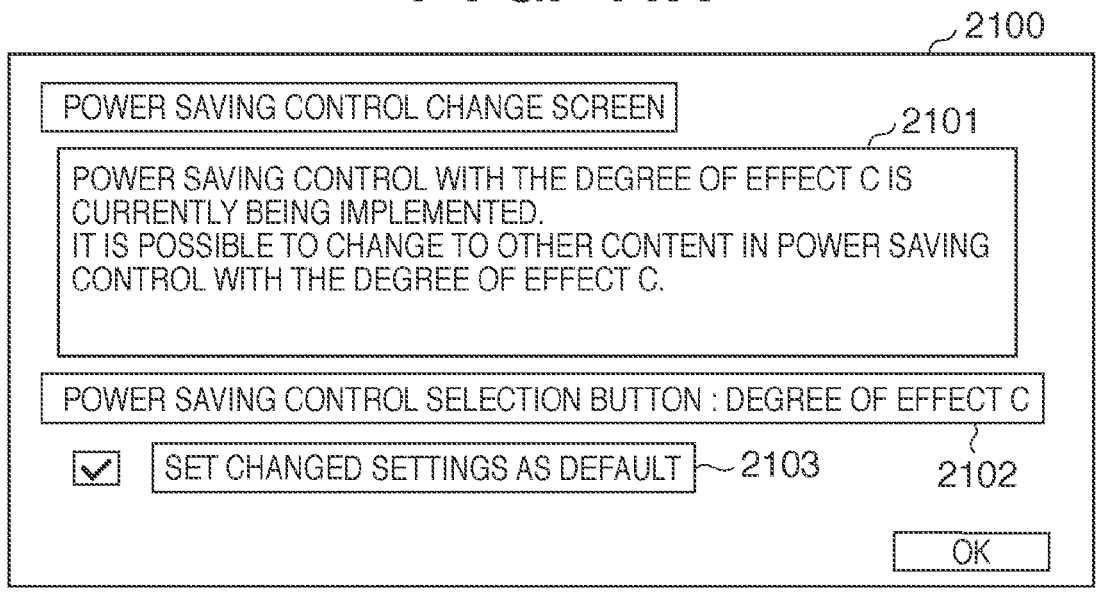
FIGS. 11A and 11B are diagrams showing power saving control change notification screens.

FIG. 11A shows an example of a screen for notifying a change of power saving control displayed on the operation unit 140 (FIG. 2) of the image forming apparatus 102. A power saving control change screen 2100 is a screen related to notification of substitute control content in S2006 in the power saving control flow shown in FIG. 10. The screen shown in the diagram includes a message display field 2101, and the degree of effect of the current power saving control is shown in that display field. Furthermore, a message indicating that the current setting can be changed to another control content that can be the substitution is displayed in the display field. The user is notified that there is substitute control content by this screen. Further, the screen 2100 includes a power saving control selection button 2102, and the pressing of this button by the user causes a transition to a power saving control change screen 2200 shown in FIG. 11B. Furthermore, the screen 2100 includes a selection field (check box) 2103 for selecting whether or not changed settings are to be made default settings. Changed settings can be applied as a default by the user putting a check in the check box.

Figure 11B:
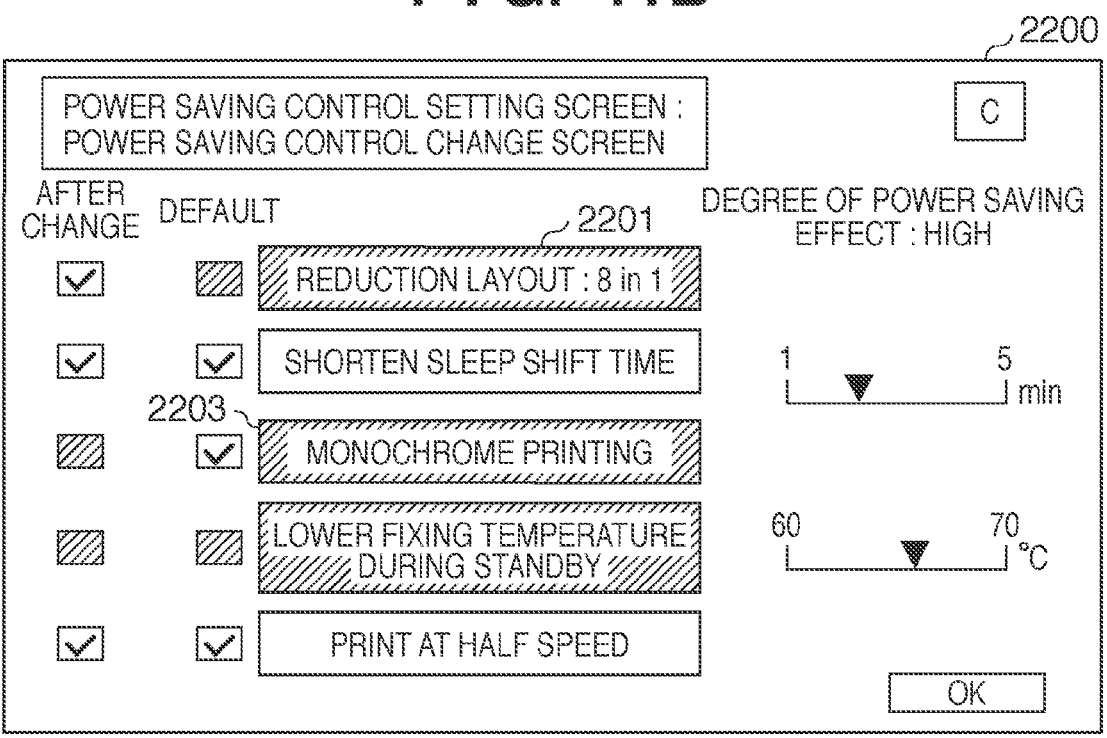

FIG. 11B shows a diagram showing an example of the power saving control change screen 2200. The screen displays selectable power saving control items in a list as with the case of the power saving control setting screens shown in FIGS. 6A to 6C, and further includes check boxes for selecting displayed items and parameter adjusting fields. The power saving control change screen 2200 includes check boxes with regard to setting before/after a change. In the case of this example, it is shown that a "monochrome printing" item 2203 is canceled by default, and setting is changed so as to adopt a "reduction layout: 8 in 1" item 2201.

As described above, in Embodiment 1, in power saving control of the network system in which the power consumption management apparatus 106 and the plurality of image forming apparatuses 102 are connected, if execution of a job instructed by the user is restricted depending on the settings of power saving control, the control content is changed to control content that allows that job to be executed, and the job is executed. In particular, a feature of the present embodiment is that a power saving setting in the control mode that is being executed is changed to a power saving setting determined as the substitution for the power saving setting, and a job is executed. It is possible to make a change of the power saving setting according to a user selection. In this way, according to the present embodiment, it is possible to flexibly change the content of power saving control according to a user selection while achieving power saving. Consequently, it is possible to improve the convenience for the user.

Embodiment 2

In Embodiment 2, it is assumed that a fixed output function in the image forming apparatus 102 is in a restricted state due to power saving control according to any of the control modes being executed in the power control system shown in FIG. 1. In other words, if the user gives a printing instruction to the image forming apparatus 102 using the general purpose computer 105, restriction is imposed on a certain output (printing) mode of the image forming apparatus 102 for power saving. Accordingly, the user cannot execute the restricted printing mode.

In the present embodiment, a print job including a plurality of printing modes that have different priorities is transmitted from the general purpose computer 105 to the image forming apparatus 102, so that a print job can be executed by changing control content of power saving control even in such a situation. A feature of the present embodiment is that the image forming apparatus 102 executes the print job in a printing mode that can be executed even with power saving settings under the power saving control that is being executed, based on the priorities given to the plurality of printing modes included in the received print job.

FIG. 12A shows a function control table managed by the image forming apparatus 102 in the case where restriction is imposed on an output (printing) mode due to power saving control. An item field 2301 shows the types of printing modes that the image forming apparatus 102 has. An item field 2302 shows the printing types of the image forming apparatus 102, that is, color or monochrome printing. An item field 2303 shows whether or not a combination of the item field 2301 and the item field 2302 is executable in the current energy saving mode, and is appropriately updated according to the state of energy saving control. An item field 2304 shows the state of printing desired by the user, and is blank if there is no printing request.

FIG. 12B shows a setting screen 2401 with regard to environmental function correspondence of a printer driver when an instruction is given to the image forming apparatus 102 to print a document or the like that has been created by the general purpose computer 105. An item field 2402 shows various modes that can be executed by the image forming apparatus 102, and can be appropriately selected by the user. An item field 2403 is an item field that displays various modes selected by the user from the item field 2402.

In FIGS. 13, 13a to 13d show printing forms desired by the user in the case where an instruction is given to the image forming apparatus 102 to print a document created by the general purpose computer 105. Note that in FIG. 13, the priorities corresponding to the user's desire decrease in the order of 13a to 13d. In FIG. 13, 13a shows a printing form that the user desires the most, and that allows the created document to be color-printed on a single side. In FIG. 13, 13b shows a printing form that the user desires the second most, and that allows the created document to be color-printed on both sides. In FIG. 13, 13c shows a printing form that the user desires the third most, and that allows the created document to be printed in monochrome on a single side. In FIG. 13, 13d shows a printing form that the user desires the fourth most, and that allows the created document to be printed in monochrome in the state of two pages on one sheet.

Figure 14B:
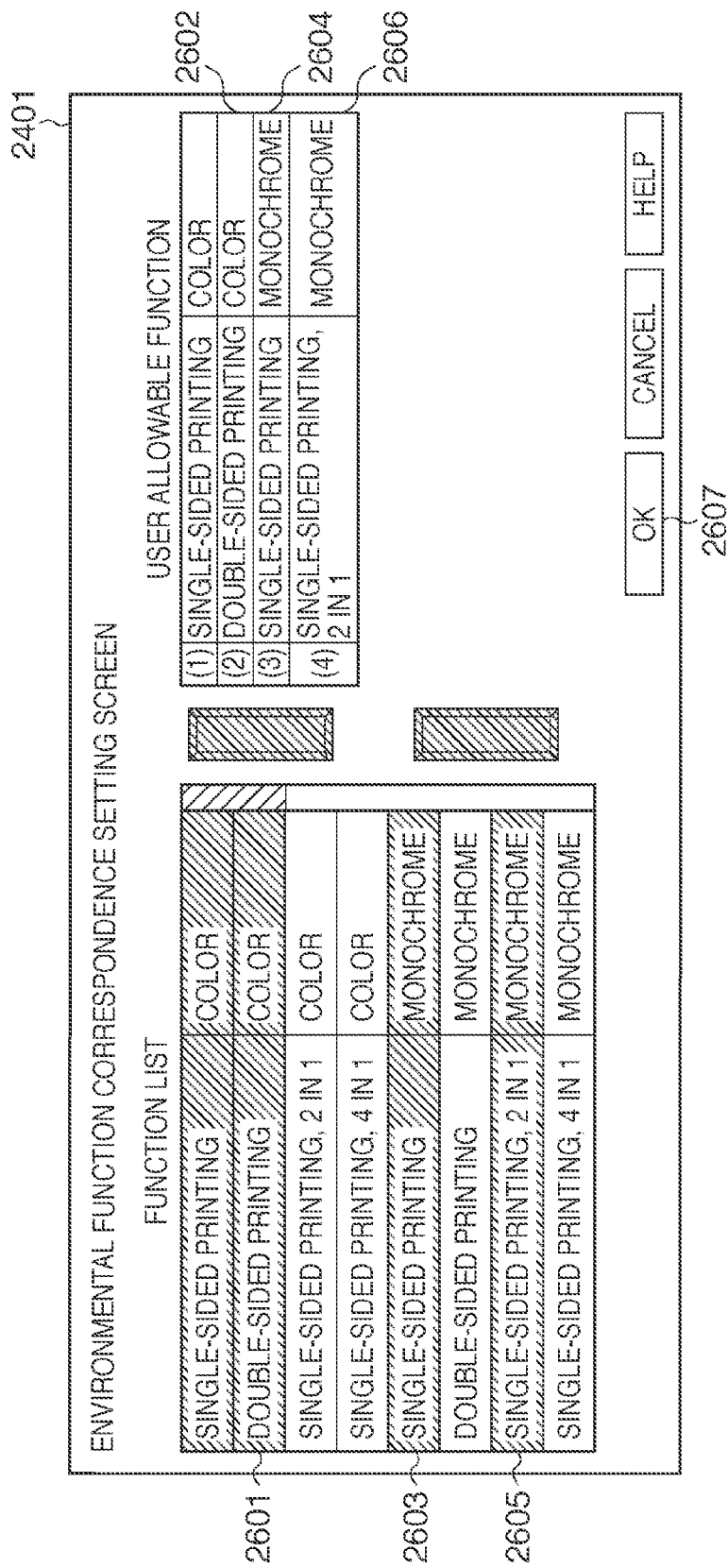

FIGS. 14A and 14B show a setting screen for the user to set a desired printing form when the user gives a printing instruction to the image forming apparatus 102 using the general purpose computer 105. The user selects a button 2501 shown in FIG. 14A, and presses a setting button 2502 since color single-sided printing shown by 13a in FIG. 13 is the most desired printing form.

Figure 16:
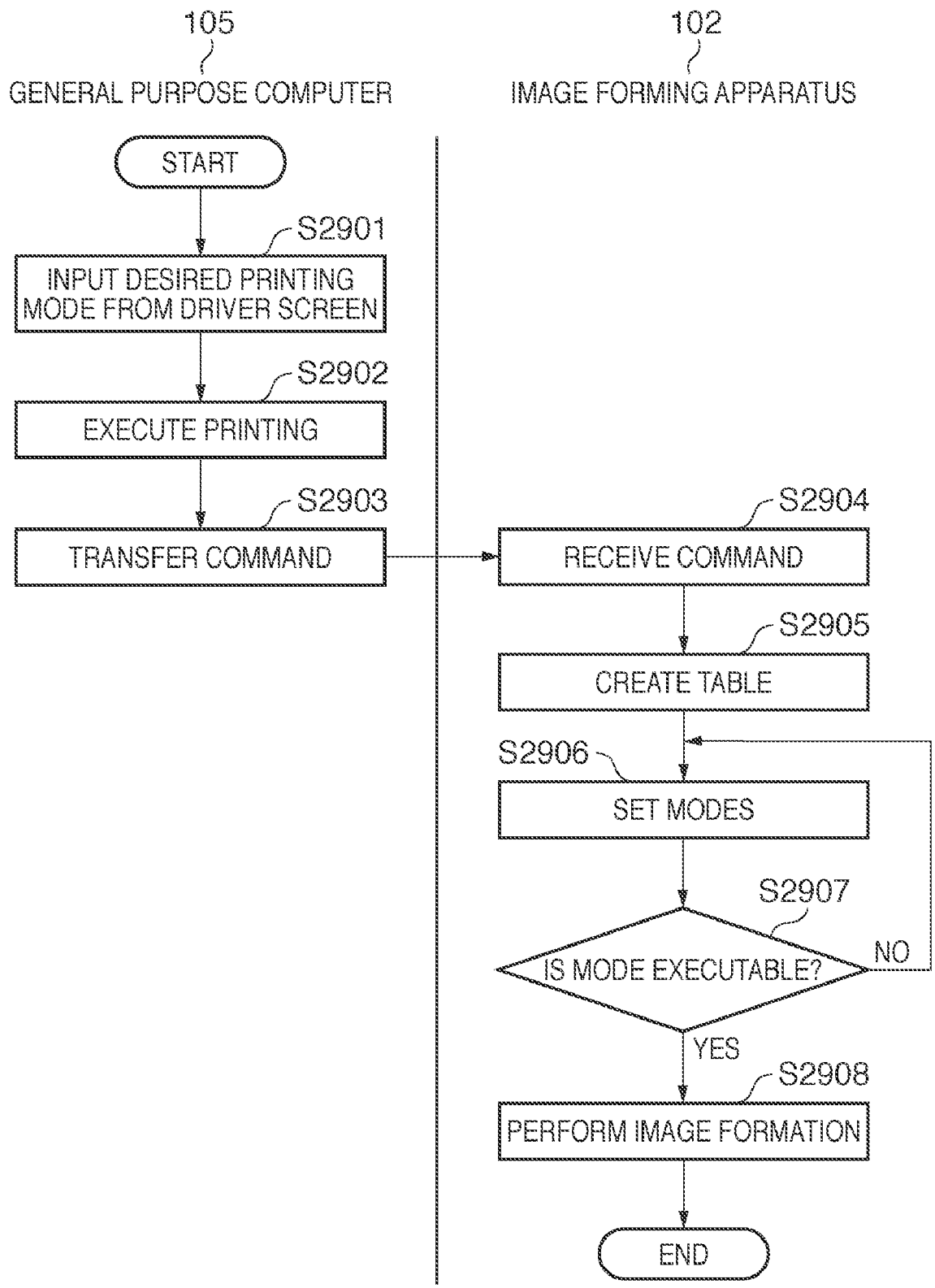
FIG. 16 is a flowchart showing operation in the case where the general purpose computer causes the image forming apparatus to perform printing.

FIG. 16 is a diagram showing the operational flow that shows a procedure according to which the image forming apparatus 102 executes printing instructed by the general purpose computer 105. In S2901, the CPU in the general purpose computer 105 registers single-sided color printing as the printing mode desired the most with the highest priority, as shown in FIG. 14A.

In the above procedure, the user similarly registers printing modes using the setting screen 2401 shown in FIG. 14B, so that they are shown in item fields 2602, 2604, and 2606 of user allowable functions in order to add priorities to the printing modes that are the second, third, and fourth most desired. Then, in S2902, the user performs the final user operation of pressing a printing execution button 2607.

If printing execution has been instructed by the user, the CPU of the general purpose computer 105 generates an instruction command (printing command) for instructing printing, as shown in FIG. 15B. A printing mode command 2701 is a command including printing modes that the user desires the most to the fourth most. A rendering command 2702 is a command including PDL data and bitmap data of a document that the user desires to print. In S2903, the command generated by the CPU of the general purpose computer 105 is transmitted to the image forming apparatus 102 (by a command transmission unit) via the wired communication medium 104 (FIG. 1).

In the image forming apparatus 102, in S2904, the CPU 1201 (FIG. 2) receives the printing command. In S2905, the CPU 1201 analyzes the printing mode command 2701 (FIG. 15A) included in the received printing command, and sets the analysis result in the item field 2304 of the function control table shown in FIG. 12A. Then, priorities are written in fields 2801 to 2804 for the desired printing state corresponding to the printing forms desired by the user, which are shown in FIG. 15B.

If a management table shown in FIG. 15B has been created in the image forming apparatus 102, in S2906, the CPU 1201 sets a printing mode in a predetermined register in descending order of priority of the printing states desired by the user in the management table. In S2907, the CPU 1201 determines whether or not desired printing corresponding to the set printing mode is executable under the energy saving control that is being currently executed. This corresponds to a determination of whether execution of the printing mode desired for printing is possible with respect to restriction items set for energy saving on the screen in FIGS. 6A to 6C corresponding to the degree of energy saving effect selected in FIG. 5.

If the state of the item field 2303 showing the executable/unexecutable state indicates "unexecutable" in the table shown in FIG. 12A, the processing returns to S2906, and the printing mode with the second highest priority is set in the predetermined register. If the state shows "executable" in S2907, in S2908, the image forming apparatus 102 creates a bitmap image from the rendering command received from the user in, for example, a printing mode desired the fourth most shown in a field 2901 shown in FIG. 15C, and performs image formation. Then, the series of operations end.

As described above, in Embodiment 2, when the image forming apparatus 102 has shifted so as to be under energy saving control, priorities are given to a plurality of printing modes desired by the user, and the modes are registered in the general purpose computer 105, and also the generated printing command is transmitted to the image forming apparatus 102. The image forming apparatus 102 analyzes the content of the received printing command, and determines whether or not execution of printing in the printing mode having the highest priority among the analyzed printing modes is to be restricted, depending on power saving settings corresponding to the control mode that is being executed. If it is determined that execution of the printing mode having the highest priority is to be restricted, the image forming apparatus 102 determines whether or not a print job can be executed in a printing mode other than that printing mode depending on the power saving settings. Moreover, the image forming apparatus 102 changes the printing mode for when performing printing based on the received print job to the printing mode having the highest priority among the printing modes determined as being executable, and that print job is executed.

In this way, in the present embodiment, the printing mode that is used is the printing mode with the highest priority that has been set by the user among printing modes that use a function that can be executed in the situation where functions are restricted depending on settings of power saving control. Accordingly, printing can be executed even in such a situation, using a limited function within the range that the user allows, and thus it is possible to improve the convenience for the user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-044632, filed Mar. 1, 2010 and No. 2010-286646, filed Dec. 22, 2010, which are hereby incorporated by reference herein in their entirety.

What is claimed is:

1. A power control system including an information processing apparatus, a power amount measurement apparatus that measures the amount of power consumption of the information processing apparatus, and a power management apparatus that manages the amount of power consumption of the information processing apparatus,
the power management apparatus comprising:
an acceptance unit that accepts reference values for the amount of power consumption that are respectively associated with a plurality of control modes for reducing the amount of power consumption of the information processing apparatus and are used for the information processing apparatus to shift to the control modes, where the greater the reference value is, the smaller the amount of power consumption of the control mode associated therewith is, and that accepts power saving settings that are respectively associated with the plurality of control modes and restrict a function that is executable in the information processing apparatus; and
a transmission unit that transmits, to the information processing apparatus, the reference values and the power saving settings that are associated with the plurality of control modes and have been accepted by the acceptance unit, and
the information processing apparatus comprising:
an information reception unit that receives the reference values and the power saving settings that are associated with the plurality of control modes and have been transmitted by the transmission unit;
an actual value reception unit that requests the power amount measurement apparatus to measure the amount of power consumed by the information processing apparatus during a predetermined power control period, and receives an actual value of the amount of power that has been consumed by the information processing apparatus during the predetermined power control period, and that has been transmitted from the power amount measurement apparatus in response to the request;
a determination unit that determines whether each of the reference values corresponding to the plurality of control modes is less than the received actual value of the amount of power consumption; and
a control unit that makes a shift, if one or more reference values determined by the determination unit as being less than the actual value exist, to the control mode corresponding to the greatest reference value among the one or more reference values determined as being less than the actual value, and performs power saving control in accordance with the power saving setting corresponding to the control mode,
wherein the control unit further changes, if execution of a job instructed by a user is restricted depending on the power saving setting corresponding to the control mode that is being executed, control content according to the control mode to control content that has been determined as a substitution for the control content and that allows the job to be executed, and executes the job.

2. The power control system according to claim 1,
wherein the control unit changes, if execution of the job instructed by the user is restricted depending on the power saving setting corresponding to the control mode that is being executed, the power saving setting corresponding to the control mode to a power saving setting that has been determined as a substitution for the power saving setting and that allows the job to be executed, and executes the job.

3. The power control system according to claim 2, wherein the control unit includes:
a unit that accepts a change request to change the power saving setting corresponding to the control mode that is being executed, when accepting an instruction with regard to the job;
a unit that displays one or more candidates for a substitute power saving setting in response to the change request; and
a unit that accepts selection from among the displayed one or more candidates for the substitute power saving setting, and
the control unit changes the power saving setting corresponding to the control mode that is being executed to the selected power saving setting, and executes the job.

4. The power control system according to claim 1, wherein the information processing apparatus further comprises:
a unit that transmits, to the power management apparatus, the actual value of the amount of power consumed by the information processing apparatus received from the power amount measurement apparatus,
the power management apparatus further comprises:
a calculation unit that, by subtracting the actual value received from the information processing apparatus from a target amount of power consumption that indicates an upper limit of the amount of power consumption in the power control system for the predetermined power control period, calculates a new target amount of power consumption for the remaining period of the predetermined power control period; and
a setting unit that sets new reference values respectively corresponding to the plurality of control modes for the remaining period according to the target amount of power consumption calculated by the calculation unit, and
the transmission unit further transmits, to the information processing apparatus, the newly-set reference values respectively corresponding to the plurality of control modes as reference values for the remaining period.

5. The power control system according to claim 1, wherein the information processing apparatus is an image forming apparatus,
the job is a print job including a plurality of printing modes to each of which a priority indicating that the printing mode is to be executed with priority has been given,
the control unit includes:
a determination unit that determines, if execution of printing according to the printing mode that has the highest priority is restricted depending on the power saving setting corresponding to the control mode that is being executed, whether printing in a printing mode other than the printing mode that has the highest priority included in the job is executable depending on the power saving setting, and
the control unit changes the printing mode used when printing according to the job is performed to the printing mode that has the highest priority among one or more printing modes determined by the determination unit as being a printing mode in which printing can be executed, and executes printing according to the job.

6. The power control system according to claim 5, wherein the power control system further includes a computer connected to a network, and
the computer includes:
a unit that accepts, as the job, a print job including a plurality of printing modes to each of which a priority has been given; and
a unit that transmits the accepted job to the information processing apparatus as an instruction command for instructing execution of printing.

7. A control method for a power control system including an information processing apparatus, a power amount measurement apparatus that measures the amount of power consumption of the information processing apparatus, and a power management apparatus that manages the amount of power consumption of the information processing apparatus, the method comprising:
accepting, in the power management apparatus, reference values for the amount of power consumption that are respectively associated with a plurality of control modes for reducing the amount of power consumption of the information processing apparatus and are used for the information processing apparatus to shift to the control modes, where the greater the reference value is, the smaller the amount of power consumption of the control mode associated therewith is, and accepting power saving settings that are respectively associated with the plurality of control modes and restrict a function that is executable in the information processing apparatus;
transmitting, in the power management apparatus, the reference values and the power saving settings that are associated with the plurality of control modes and have been accepted in the acceptance to the information processing apparatus;
receiving, in the information processing apparatus, the reference values and the power saving settings that are associated with the plurality of control modes and have been transmitted in the transmission;
requesting, in the information processing apparatus, the power amount measurement apparatus to measure the amount of power consumed by the information processing apparatus during a predetermined power control period, and receiving an actual value of the amount of power that has been consumed by the information processing apparatus during the predetermined power control period, and that has been transmitted from the power amount measurement apparatus in response to the request;
determining, in the information processing apparatus, whether each of the reference values corresponding to the plurality of control modes is less than the received actual value of the amount of power consumption; and
performing, in the information processing apparatus, control in which if one or more reference values determined in the determination as being less than the actual value exist, a shift is made to the control mode corresponding to the greatest reference value among the one or more reference values determined as being less than the actual value, and power saving control is performed in accordance with the power saving setting corresponding to the control mode,
wherein in the control,
if execution of a job instructed by a user is restricted depending on the power saving setting corresponding to the control mode that is being executed, control content according to the control mode is further changed to control content that has been determined as a substitution for the control content and that allows the job to be executed, and the job is executed.

* * * * *